(12) United States Patent
Sollie et al.

(10) Patent No.: US 12,522,420 B2
(45) Date of Patent: *Jan. 13, 2026

(54) HINGED WRAP INSULATED CONTAINER

(71) Applicant: Pratt Retail Specialties, LLC, Brookhaven, GA (US)

(72) Inventors: Greg Sollie, Sharpsburg, GA (US); Jamie Waltermire, Peachtree City, GA (US); Shifeng Chen, Newport News, VA (US); Markel Graham, Acworth, GA (US)

(73) Assignee: Pratt Retail Specialties, LLC, Brookhaven, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/185,469

(22) Filed: Apr. 22, 2025

(65) Prior Publication Data
US 2025/0242992 A1     Jul. 31, 2025

Related U.S. Application Data

(63) Continuation of application No. 18/208,704, filed on Jun. 12, 2023, now Pat. No. 12,286,286, which is a
(Continued)

(51) Int. Cl.
*B65D 81/38* (2006.01)
*B31B 50/81* (2017.01)
(Continued)

(52) U.S. Cl.
CPC .......... *B65D 81/3823* (2013.01); *B31B 50/81* (2017.08); *B65D 5/58* (2013.01); *B31B 2110/35* (2017.08); *B31B 2120/407* (2017.08)

(58) Field of Classification Search
CPC .. B65D 81/3823; B65D 5/58; B65D 81/3862; B65D 81/3858; B65D 81/3853; B65D 81/051; B65D 81/38
(Continued)

(56) References Cited

U.S. PATENT DOCUMENTS 1,993,394 A    3/1935 Bangs et al.
3,883,065 A *  5/1975 Presnick .................. B65D 5/58
                                            220/666
(Continued)

FOREIGN PATENT DOCUMENTS

AU    2023285879 B2    4/2025
AU    2024200915 B2    4/2025
(Continued)

OTHER PUBLICATIONS

Sollie, Greg; Requirement for Restriction/Election for U.S. Appl. No. 18/208,704, filed Jun. 12, 2023, mailed Jan. 9, 2024, 6 pgs.
(Continued)

*Primary Examiner* — Christopher R Demeree
(74) *Attorney, Agent, or Firm* — Taylor Duma LLP

(57) ABSTRACT

A packaging assembly including an outer box including a plurality of side panels defining an interior cavity; and a wrap liner including an outer portion extending from a first panel to a second panel, the outer portion defining an outer hinge coupling the first panel to the second panel; a ledge portion extending across the first panel and the second panel, the ledge portion coupled to the outer portion by a first ledge hinge and a second ledge hinge; and an inner portion extending across the first panel and the second panel, a first inner hinge, and a second inner hinge each coupling the inner portion to the ledge portion; wherein the wrap liner is disposed within the interior cavity of the outer box.

19 Claims, 41 Drawing Sheets

Related U.S. Application Data continuation of application No. 17/307,650, filed on May 4, 2021, now Pat. No. 11,718,464.

(60) Provisional application No. 63/020,346, filed on May 5, 2020.

(51) Int. Cl.
  *B65D 5/58* (2006.01)
  *B31B 110/35* (2017.01)
  *B31B 120/40* (2017.01)

(58) Field of Classification Search
  USPC .............. 229/103.11, 167, 122.32, 199, 193; 206/594; 220/921, 592.25
  See application file for complete search history.

(56) References Cited

U.S. PATENT DOCUMENTS

| | | | |
|---|---|---|---|
| 5,414,039 | A | 5/1995 | Watson et al. |
| 5,454,909 | A | 10/1995 | Morganelli |
| 6,103,809 | A | 8/2000 | Ahmed et al. |
| 9,211,970 | B2 | 12/2015 | Hubbard, Jr. et al. |
| 9,505,516 | B2 | 11/2016 | Hubbard, Jr. et al. |
| 9,533,790 | B2 | 1/2017 | Williams |
| 9,828,165 | B2 | 11/2017 | Ranade et al. |
| 12,286,286 | B2 | 4/2025 | Sollie et al. |
| 12,365,529 | B2 | 7/2025 | Collison et al. |
| 12,371,221 | B2 | 7/2025 | Sollie et al. |
| 12,415,649 | B2 | 9/2025 | Sollie et al. |
| 2001/0004088 | A1 | 6/2001 | Lau |
| 2010/0263812 | A1 | 10/2010 | Awadel-karim |
| 2010/0326993 | A1 | 12/2010 | Mayer et al. |
| 2011/0095245 | A1 | 4/2011 | Munson et al. |
| 2011/0100868 | A1* | 5/2011 | Lantz ................ B65D 81/3853 206/584 |
| 2011/0147391 | A1 | 6/2011 | Corder et al. |
| 2012/0279896 | A1* | 11/2012 | Lantz .................... B65D 25/16 53/473 |
| 2018/0215525 | A1* | 8/2018 | Vogel ...................... F25D 3/125 |
| 2020/0032454 | A1 | 1/2020 | Soidinsalo |
| 2020/0148453 | A1* | 5/2020 | Sollie ................ B65D 81/3823 |
| 2023/0322466 | A1 | 10/2023 | Sollie et al. |
| 2024/0158155 | A1 | 5/2024 | Coles |
| 2025/0250095 | A1 | 8/2025 | Waltermire et al. |
| 2025/0257932 | A1 | 8/2025 | Waltermire et al. |
| 2025/0326562 | A1 | 10/2025 | Sollie et al. |

FOREIGN PATENT DOCUMENTS

| | | |
|---|---|---|
| AU | 2024200916 B2 | 4/2025 |
| AU | 2024200959 B2 | 4/2025 |
| AU | 2024200964 B2 | 4/2025 |
| CA | 2097735 A1 * | 6/1993 |
| CA | 3176052 | 9/2025 |

OTHER PUBLICATIONS

Sollie, Greg; Non-Final Office Action for U.S. Appl. No. 18/208,704, filed Jun. 12, 2023, mailed Feb. 13, 2024, 148 pgs.

Sollie, Greg; Non-Final Office Action for U.S. Appl. No. 18/208,704, filed Jun. 12, 2023, mailed May 22, 2024, 18 pgs.

Sollie, Greg; Non-Final Office Action for U.S. Appl. No. 18/208,704, filed Jun. 12, 2023, mailed Sep. 13, 2024, 13 pgs.

Sollie, Greg; Notice of Allowance for U.S. Appl. No. 18/208,704, filed Jun. 12, 2023, mailed Jan. 2, 2025, 26 pgs.

Waltermire, Jamie; Advisory Action for U.S. Appl. No. 18/385,726, filed Oct. 31, 2023, mailed Jul. 16, 2025, 11 pgs.

Waltermire, Jamie; Advisory Action for U.S. Appl. No. 18/734,865, filed Jun. 5, 2024, mailed Aug. 11, 2025, 5 pgs.

Waltermire, Jamie; Non-Final Office Action for U.S. Appl. No. 18/734,865, filed Jun. 5, 2024, mailed Sep. 17, 2025, 20 pgs.

Collison, Alan B.; Applicant-Initiated Interview Summary for U.S. Appl. No. 18/612,835, filed Mar. 21, 2024, mailed Jun. 25, 2025, 2 pgs.

Waltermire, Jamie; Requirement for Restriction/Election for U.S. Appl. No. 18/747,098, filed Jun. 18, 2024, mailed Aug. 28, 2025, 8 pgs.

Waltermire, Jamie; Final Office Action for U.S. Appl. No. 18/115,791, filed Mar. 1, 2023, mailed Jul. 23, 2025, 22 pgs.

Waltermire, Jamie; Final Office Action for U.S. Appl. No. 17/173,293, filed Feb. 11, 2021, mailed Jul. 25, 2025, 17 pgs.

Waltermire, Jamie; Notice of Allowance for U.S. Appl. No. 17/127,060, filed Dec. 18, 2020, mailed Sep. 11, 2025, 17 pgs.

Waltermire, Jamie; Non-Final Office Action for U.S. Appl. No. 18/385,726, filed Oct. 31, 2023, mailed Aug. 27, 2025, 20 pgs.

Waltermire, Jamie; Advisory Action for U.S. Appl. No. 17/538,795, filed Nov. 30, 2021, mailed Aug. 26, 2025, 9 pgs.

Waltermire, Jamie; Notice of Allowance for U.S. Appl. No. 18/197,300, filed May 15, 2023, mailed Aug. 5, 2025, 16 pgs.

Waltermire, Jamie; Final Office Action for U.S. Appl. No. 19/188,779, filed Apr. 24, 2025, mailed Sep. 16, 2025, 14 pgs.

Sollie, Greg; Non-Final Office Action for U.S. Appl. No. 19/252,342, filed Jun. 27, 2025, mailed Jul. 24, 2025, 9 pgs.

Anagnostopoulos, John; Final Office Action for U.S. Appl. No. 19/056,573, filed Feb. 18, 2025, mailed Sep. 12, 2025, 28 pgs.

https://www.acme-hardesty.com/product/sodiu m-coco-sulfate-scs-95/ (Year: 2014).

Waltermire, Jamie; Examination Report for Australian Patent Application No. 2024208808, filed Nov. 8, 2018, mailed Sep. 5, 2025, 7 pgs.

MP Global Products, L.L.C.; Examination Report for Australian Patent Application No. 2024201654, filed Nov. 7, 2017, mailed Jun. 26, 2025, 4 pgs.

Collison, Alan B.; Notice of Allowance for U.S. Appl. No. 18/612,835, filed Mar. 21, 2024, mailed Oct. 28, 2025, 7 pgs.

Waltermire, Jamie; Non-Final Office Action for U.S. Appl. No. 18/115,791, filed Mar. 1, 2023, mailed Nov. 28, 2025, 27 pgs.

Waltermire, Jamie; Advisory Action for U.S. Appl. No. 17/173,293, filed Feb. 11, 2021, mailed Oct. 1, 2025, 3 pgs.

Waltermire, Jamie; Non-Final Office Action for U.S. Appl. No. 17/173,293, filed Feb. 11, 2021, mailed Dec. 5, 2025, 24 pgs.

Waltermire, Jamie; Corrected Notice of Allowance for U.S. Appl. No. 18/197,300, filed May 15, 2023, mailed Nov. 26, 2025, 8 pgs.

Waltermire, Jamie; Notice of Allowance for U.S. Appl. No. 19/188,779, filed Apr. 24, 2025, mailed Nov. 17, 2025, 13 pgs.

Sollie, Greg; Non-Final Office Action for U.S. Appl. No. 19/252,342, filed Jun. 27, 2025, mailed Nov. 28, 2025, 11 pgs.

Sollie, Greg; Requirement for Restriction/Election for U.S. Appl. No. 19/328,837, filed Sep. 15, 2025, mailed Oct. 30, 2025, 6 pgs.

Sollie, Greg; Notice of Allowance for U.S. Appl. No. 18/974,426, filed Dec. 9, 2024, mailed Sep. 26, 2025, 12 pgs.

Waltermire, Jamie; Examination Report for Australian Patent Application No. 2024227354, filed Nov. 8, 2018, mailed Nov. 28, 2025, 4 pgs.

Pratt Retail Pty Ltd; Office Action for Chinese Patent Application No. 202311045972.8, filed Nov. 7, 2017, mailed Nov. 29, 2025, 6 pgs.

* cited by examiner

HINGED WRAP INSULATED CONTAINER

CROSS-REFERENCE TO RELATED APPLICATIONS

This application is a continuation of U.S. patent application Ser. No. 18/208,704, filed on Jun. 12, 2023, which is a continuation of U.S. patent application Ser. No. 17/307,650, filed on May 4, 2021, which issued as U.S. Pat. No. 11,718,464 on Aug. 8, 2023, which claims the benefit of U.S. Provisional Application No. 63/020,346, filed on May 5, 2020, each of which is hereby incorporated by reference in its entirety.

JOINT RESEARCH AGREEMENT

The subject matter disclosed was developed and the claimed invention was made by, or on behalf of, one or more parties to a joint research agreement between MP Global Products LLC of Norfolk, NE and Pratt Retail Specialties, LLC of Conyers, GA, that was in effect on or before the effective filing date of the claimed invention, and the claimed invention was made as a result of activities undertaken within the scope of the joint research agreement.

TECHNICAL FIELD

This disclosure relates to packaging. More specifically, this disclosure relates to a hinged insulation wrap of an insulated container.

BACKGROUND

Packaging and shipping temperature sensitive contents can pose challenges. The contents can spoil, destabilize, freeze, melt, or evaporate during storage or shipping if the temperature of the contents is not maintained or the packaging is not protected from hot or cold environmental conditions. In applications such as hot food delivery, customers can be dissatisfied if the contents have cooled to ambient temperature upon delivery. Contents such as food, pharmaceuticals, electronics, or other temperature sensitive items can be damaged if exposed to temperature extremes. Many insulated packages are bulky and difficult to store prior to use. Additionally, many insulated packages are specialized to ship or carry hot goods, chilled goods, or frozen goods, and shippers must maintain large stocks of specialized packaging for each application. Additionally, many insulated packages cannot be recycled and are often disposed of in landfills.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a packaging assembly including an outer box including a plurality of side panels defining an interior cavity; and a wrap liner including an outer portion extending from a first panel to a second panel, the outer portion defining an outer hinge coupling the first panel to the second panel; a ledge portion extending across the first panel and the second panel, the ledge portion coupled to the outer portion by a first ledge hinge and a second ledge hinge; and an inner portion extending across the first panel and the second panel, a first inner hinge, and a second inner hinge each coupling the inner portion to the ledge portion; wherein the wrap liner is disposed within the interior cavity of the outer box.

Also disclosed is a wrap liner for use in a packaging assembly including a box, the wrap liner including an outer portion extending from a first panel to a second panel, the outer portion defining an outer hinge coupling the first panel to the second panel; a ledge portion extending across the first panel and the second panel, the ledge portion coupled to the outer portion by a first ledge hinge and a second ledge hinge; and an inner portion extending across the first panel and the second panel, a first inner hinge, and a second inner hinge each coupling the inner portion to the ledge portion; wherein the wrap liner is disposed within the interior cavity of the outer box.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
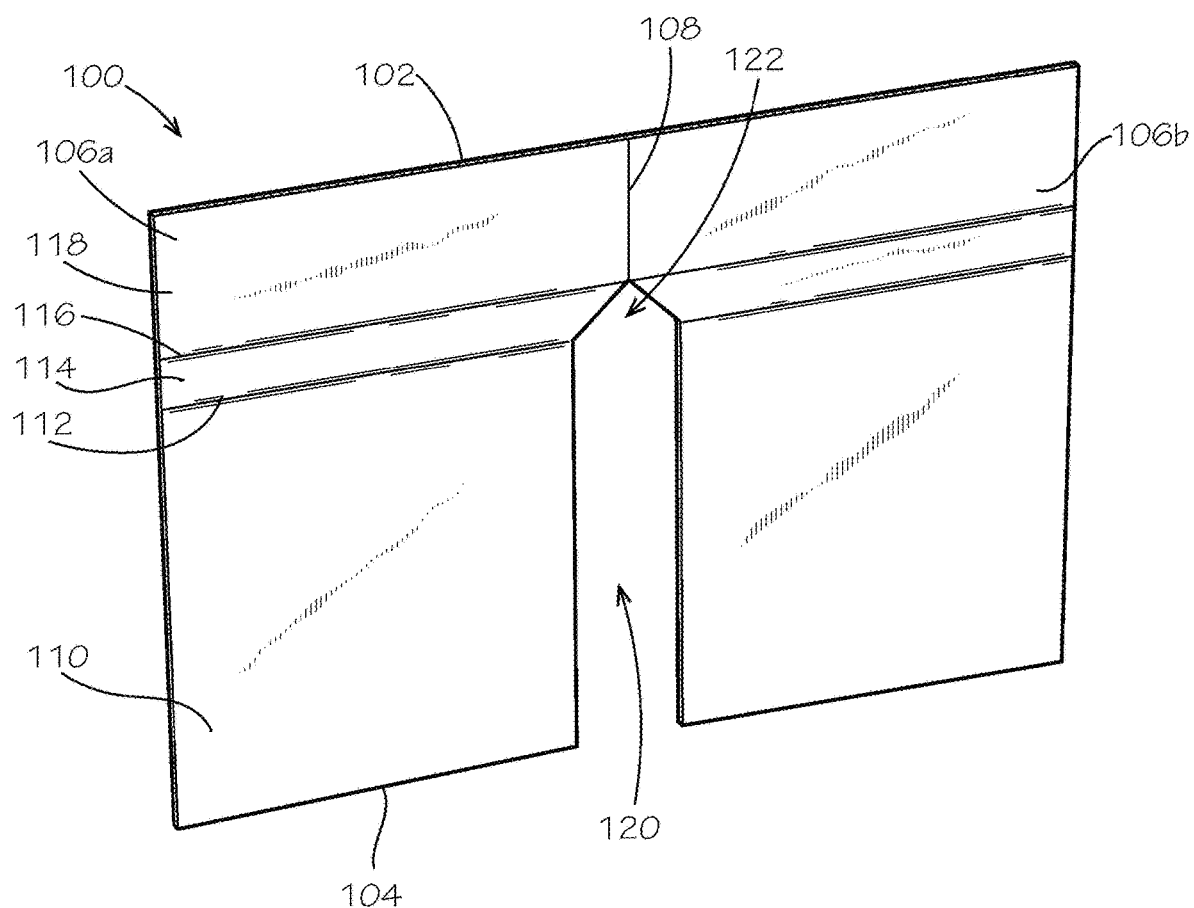
FIG. 1 is a perspective view of a wrap liner blank in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a packaging assembly and associated methods, systems, devices, and various apparatus. The packaging assembly can comprise a box, an insulation wrap, and at least one plug. It would be understood by one of skill in the art that the disclosed packaging assembly is described in but a few exemplary embodiments among many. No particular terminology or description should be considered limiting on the disclosure or the scope of any claims issuing therefrom.

FIG. 1 is a perspective view of a wrap liner blank 100 in accordance with one aspect of the present disclosure. In the present aspect, the wrap liner blank 100 can comprise two panels 106a,b; however, in other aspects, such as the wrap liner blank 600 shown in FIG. 6, the wrap liner blank can comprise more than two panels.

The wrap liner blank 100 can define a top end 102 and a bottom end 104, with the top end 102 disposed opposite from the bottom end 104. The wrap liner blank 100 can comprise an inner portion 110, a ledge portion 114, and an outer portion 118, each of which can extend across both panels 106a,b. The inner portion 110 can be hingedly coupled to the ledge portion 114 by an inner hinge 112, and the outer portion 118 can be hingedly coupled to the ledge portion 114 by a ledge hinge 116.

The wrap liner blank 100 can define an inner clearance notch 120, which can separate the inner portion 110 defined by panel 106a from the inner portion 110 defined by the adjacent panel 106b. The wrap liner blank 100 can define a ledge clearance notch 122, which can separate the ledge portion 114 defined by panel 106a from the ledge portion 114 defined by the adjacent panel 106b. The wrap liner blank 100 can define an outer hinge 108, which can hingedly couple the outer portion 118 defined by panel 106a to the outer portion 118 defined by the adjacent panel 106b.

Figure 2:
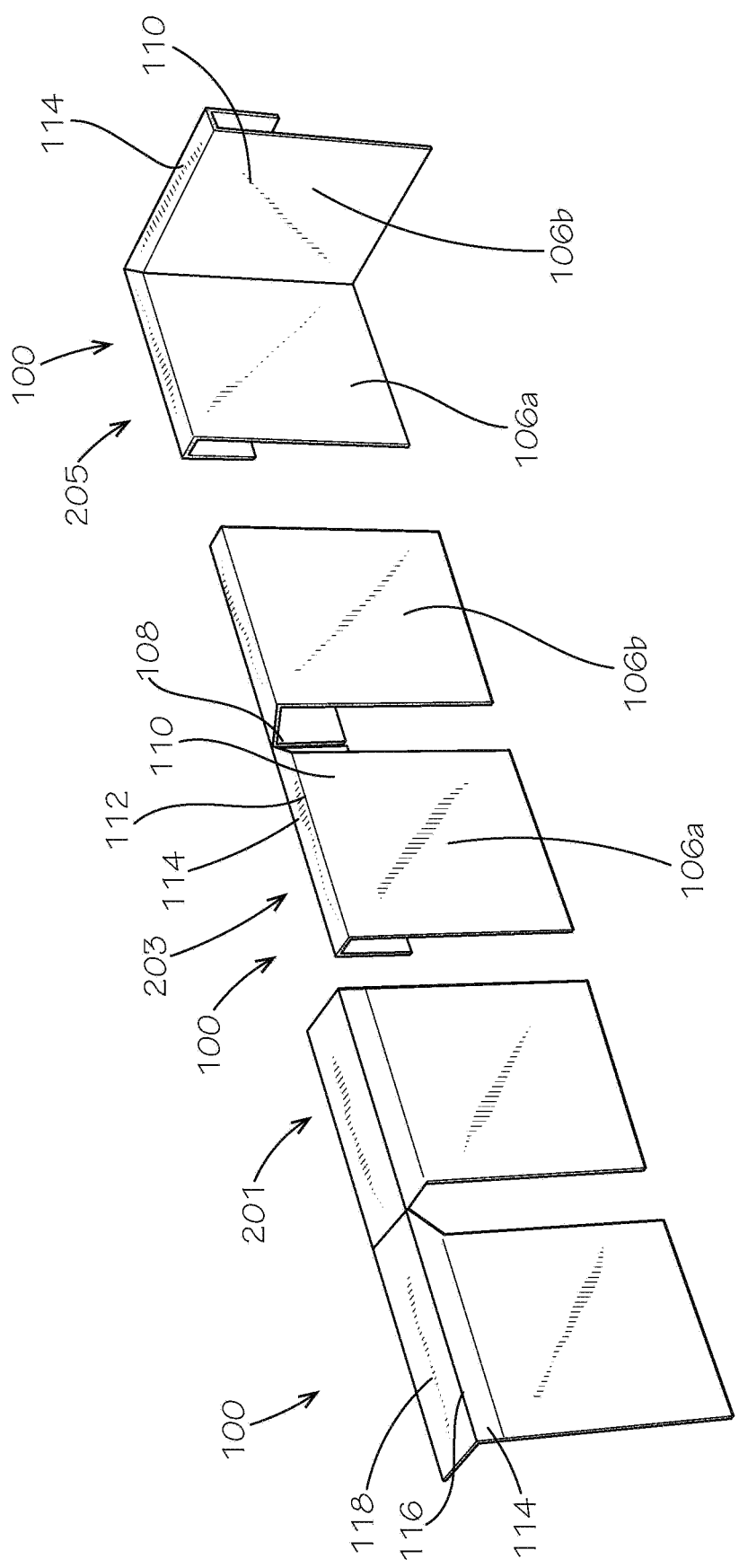
FIG. 2 is a perspective view of the wrap liner blank of FIG. 1 demonstrating steps to place the wrap liner blank in an assembled configuration and a folded configuration.

FIG. 2 is a perspective view showing steps 201,203,205 to place the wrap liner blank in an assembled configuration and then to place the wrap liner blank 100 in the assembled and folded configuration. The steps 201,203,205 can be similar for assembling and folding an insulation wrap 601 (shown in FIG. 6) from the wrap liner 600 (shown in FIG. 6) and an insulation batt 690 (show in FIG. 6), in accordance with another aspect of the disclosure. Here in FIG. 2, the wrap liner blank 100 is shown alone without an insulation batt to provide an unobstructed view.

In step 201, the outer portion 118 of the wrap liner blank 100 can be folded relative to the ledge portion 114 about the ledge hinge 116 to place the wrap liner blank 100 in a partially assembled configuration. In step 203, the ledge portion 114 can be folded relative to the inner portion 110 about the inner hinge 112 to place the wrap liner blank 100 in an assembled configuration. As shown in step 203, the wrap liner blank 100 can be in the assembled configuration and in an unfolded configuration.

In other aspects, steps 201,203 can be performed in reverse order. For example, the wrap liner blank 100 can first be folded about the inner hinge 112 in accordance with step 203 to place the wrap liner blank 100 in the partially assembled configuration, and the wrap liner blank 100 can then be folded about the outer hinge 116 to place the wrap liner blank 100 in the assembled configuration. In the partially assembled configuration, the panels 106a,b of the wrap liner blank 100 are only folded about one of the inner hinge 112 and the outer hinge 116. In the assembled configuration, the panels 106a,b, of the wrap liner blank 100 can be folded about both the inner hinge 112 and the outer hinge 116. In the assembled configuration, the outer portion 118 can be substantially parallel to the inner portion 110, and the ledge portion 114 can be substantially perpendicular to both the inner portion 110 and the outer portion 118.

In step 205, the panels 106a,b can be folded relative to one another about the outer hinge 108 from the assembled and unfolded configuration to an assembled and folded configuration. In the unfolded configuration, the inner portion 110 and outer portion 118 of adjacent panels 106a,b of the assembled wrap liner blank 100 can be substantially parallel and coplanar to one another, respectively. In the folded configuration, the inner portion 110 and outer portion 118 of adjacent panels 106a,b, can be substantially perpendicular to one another. In the folded configuration, adjacent panels 106a,b can be positioned so that the ledge portion 114 defined by panel 106a contacts the ledge portion 114 defined by panel 106b and that the inner portion 110 defined by panel 106a contacts the inner portion 110 defined by panel 106b.

In the aspect shown, the wrap liner blank 100 can be configured to be positioned with a second wrap liner blank 100 (not shown) to form a square or rectangular cross-sectional shape when both wrap liner blanks 100 are in the assembled and folded configuration. In other aspects, the wrap liner blank 100 can have four panels 106, and the wrap liner blank 100 can define a square or rectangular in cross-sectional shape in the assembled and folded configuration, as demonstrated by the wrap liner 600 in FIG. 6. The steps 203,205,207 shown in FIG. 2 can apply for wrap liner blanks comprising more than two panels 106a,b. For example, the steps can be the same for insulation wrap 601 in FIG. 6.

Figure 3:
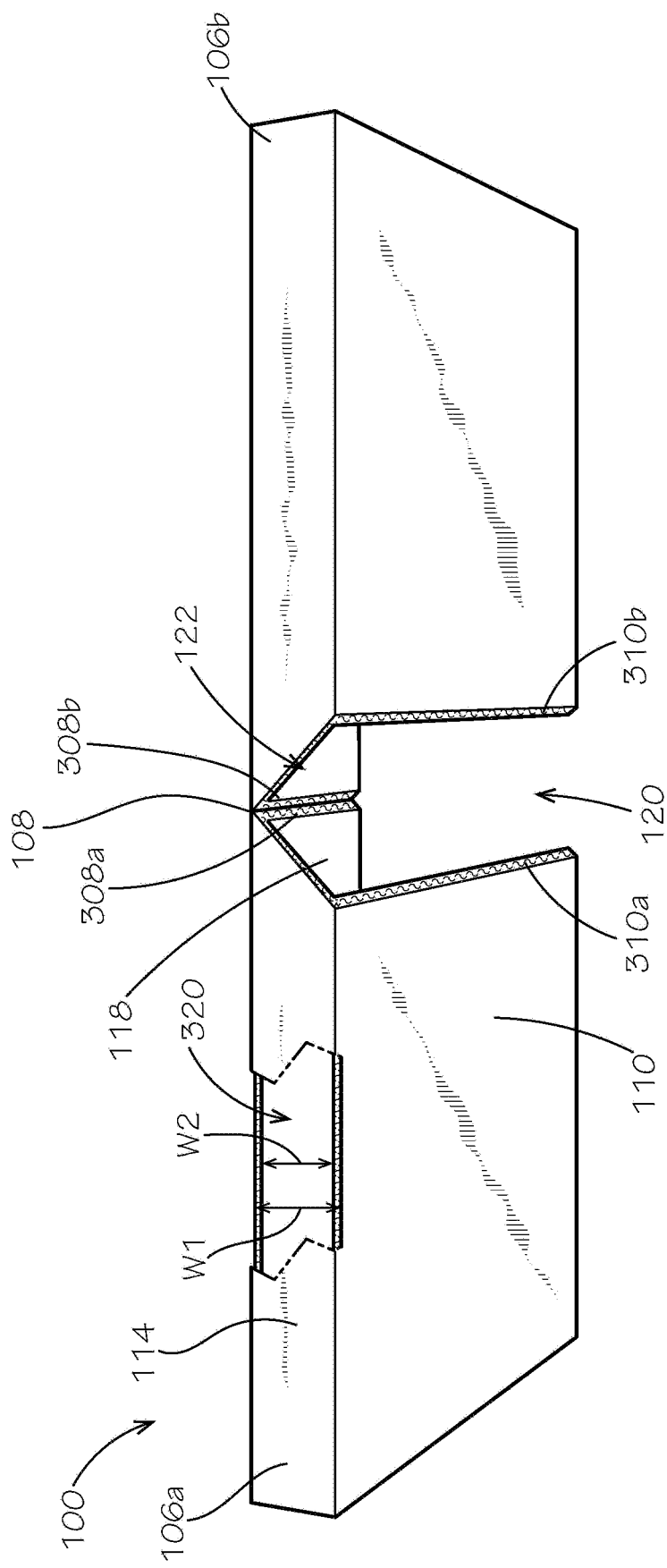
FIG. 3 is a front perspective view of the wrap liner blank of FIG. 1 in an assembled and unfolded configuration.

FIG. 3 is a front perspective view of the wrap liner blank 100 in the assembled and unfolded configuration. The inner portion 110 of the panels 106a,b can define relieved edges 310a,b adjacent to the inner clearance notch 120. The relieved edges 310a,b can be beveled, chamfered, or mitered, for example and without limitation, so that adjacent relieved edges 310a,b can mate with one another when positioned together in the assembled and folded configuration shown in FIG. 4. The outer portion 118 of the panels 106a,b can define relieved edges 308a,b adjacent to the outer hinge 108. The relieved edges 308a,b can be beveled, chamfered, or mitered (for example and without limitation), so that adjacent relieved edges 308a,b can mate with one another and minimized deformation when adjacent panels 106a,b are folded about the outer hinge 108 to the assembled and folded configuration.

As demonstrated by a cutaway of the ledge portion 114, a channel 320 can be defined between the inner portion 110 and the outer portion 118. The ledge portion 114 can define a width W1, and the channel 320 can define a width W2. The width W2 can be slightly smaller than the width W1. As similarly discussed below with respect to FIG. 8, the channel 320 can be configured to receive an insulation batt. In the various aspects, the width W2 can range from less than one inch to greater than two inches, and the channel 320 can be configured to receive insulation batts with a thickness of less than one inch to greater than two inches.

Figure 4:
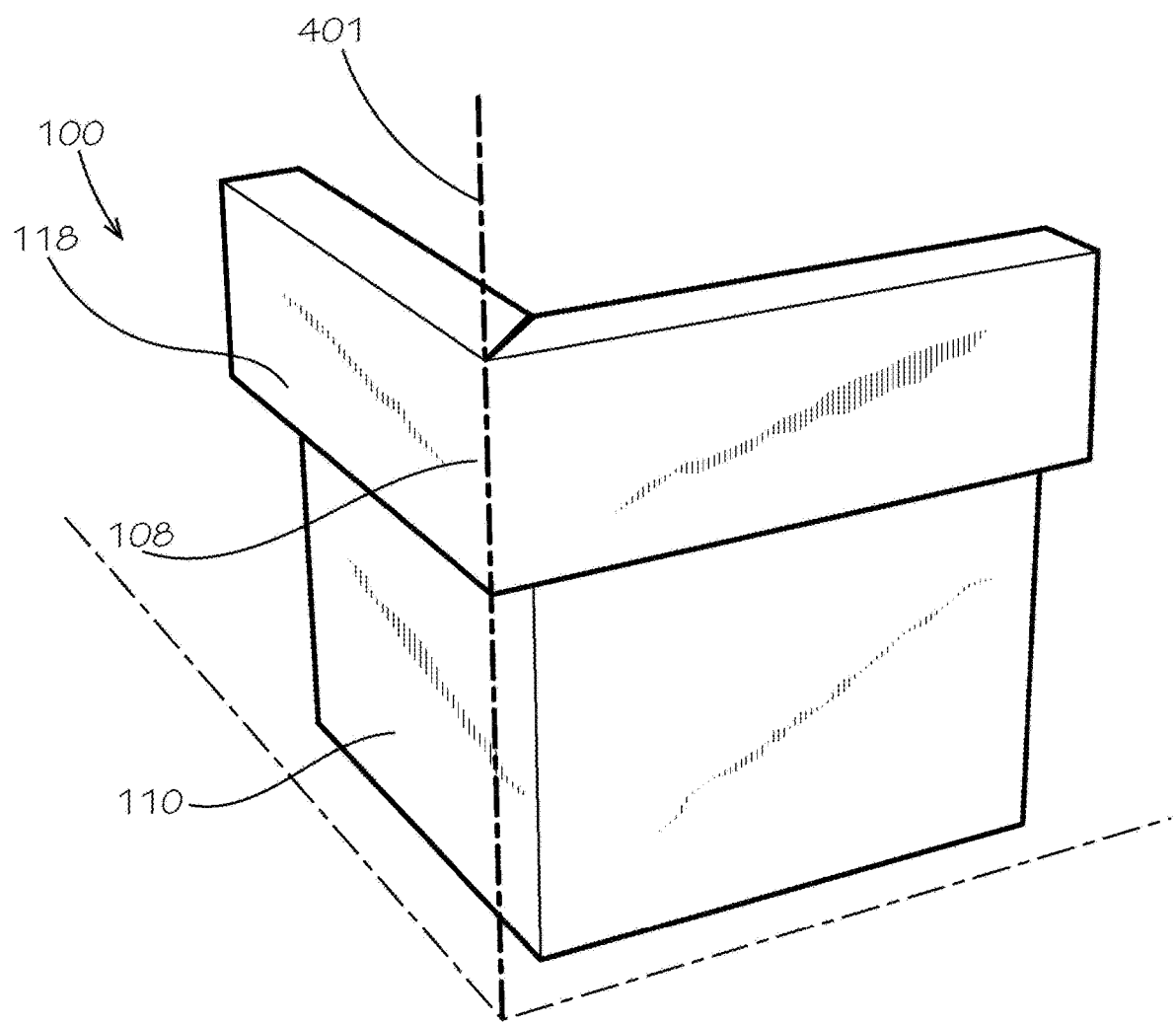
FIG. 4 is a rear perspective view of the wrap liner blank of FIG. 1 in an assembled and folded configuration.

FIG. 4 is a rear perspective view of the wrap liner blank 100 of FIG. 1 in the assembled and folded configuration. As shown, the outer hinge 108 can define an outer hinge axis 401, which can extend through the outer portion 118 but not the inner portion 110.

Figure 5:
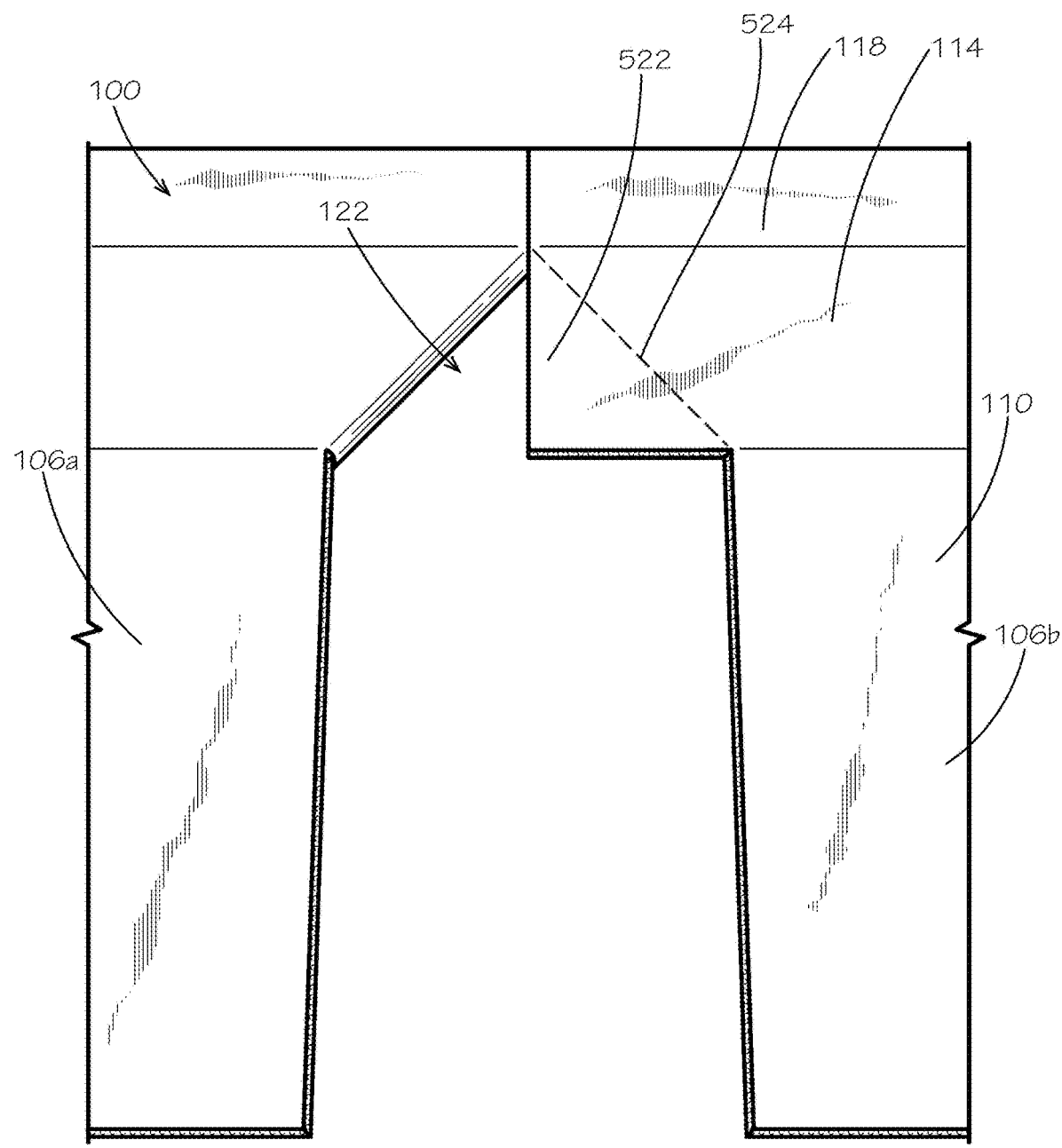
FIG. 5 is a detailed view of a ledge clearance notch of another aspect of the wrap liner blank in accordance with another aspect of the present disclosure.

FIG. 5 is a detailed view of the ledge clearance notch 122 of another aspect of the wrap liner blank 100 in accordance with another aspect of the present disclosure. As shown by panel 106b, in some aspects, the ledge clearance notch 122 can be formed by folding a tab 522 of the ledge portion 114 about a clearance notch hinge 524. The clearance notch hinge 524 can extend across the ledge portion 114 from the inner portion 110 to the outer portion 118. Panel 106a can also define a clearance notch hinge (not shown) and a tab (not shown). In some aspects, the ledge portion 114 can be cut, rather than folded, to form the ledge clearance notch 122. In the present aspect, the ledge clearance notch 122 can define the shape of a triangle, such as an isoceles triangle for example and without limitation. In other aspects, the ledge clearance notch can define a different shape, such as a trapezoid or any other suitable shape.

Figure 6:
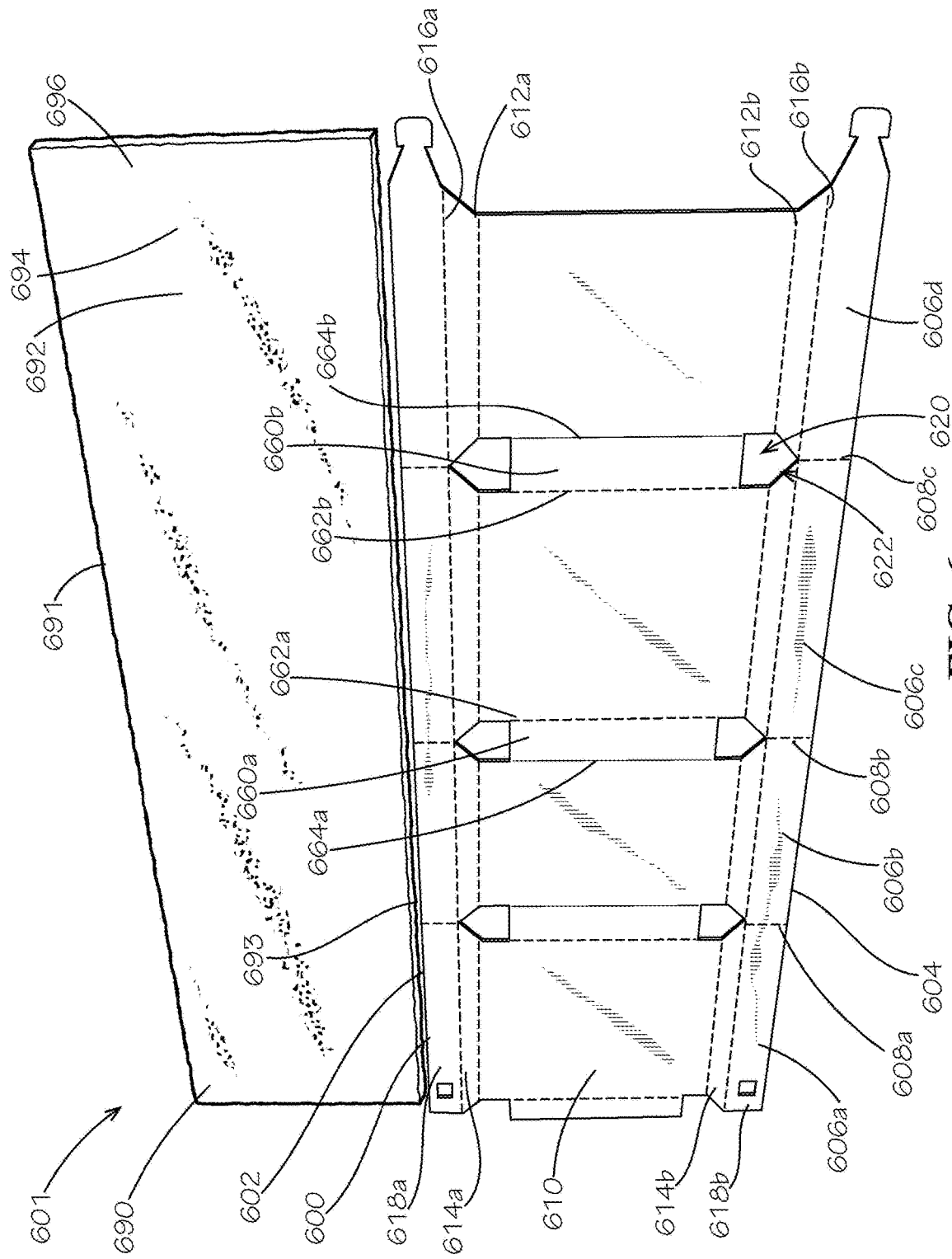
FIG. 6 is a top perspective view of an insulation wrap, in an unassembled configuration, comprising an insulation batt and another aspect of the wrap liner blank in accordance with another aspect of the present disclosure.
Figure 7:
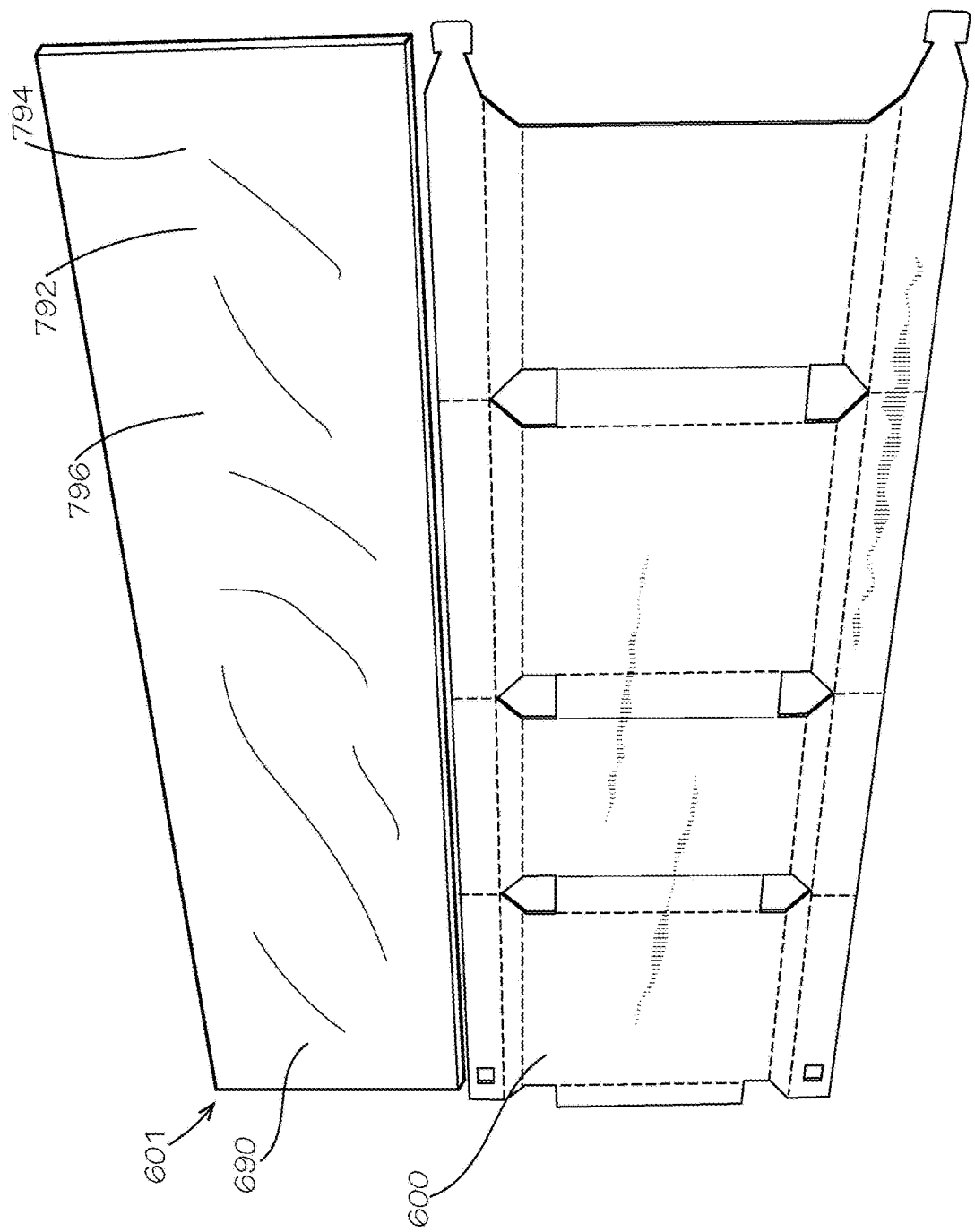
FIG. 7 is a top perspective view of the insulation wrap of FIG. 6 in the unassembled configuration.

FIG. 6 and FIG. 7 are top perspective views of the insulation wrap 601 in an unassembled configuration, in accordance with another aspect of the present disclosure. The insulation wrap 601 can comprise the wrap liner blank 600 and the insulation batt 690.

As shown in FIG. 6, the wrap liner blank 600 can comprise four panels 606a,b,c,d. The wrap liner blank 600 can define a top end 602 and a bottom end 604, with the top end 602 disposed opposite from the bottom end 604. The wrap liner blank 600 can comprise an inner portion 610, a first ledge portion 614a, a second ledge portion 614b, a first outer portion 618a, and a second outer portion 618b. The inner portion 610 can be hingedly coupled to the ledge portions 614a,b by a pair of inner hinges 612a,b, respectively. The outer portions 618a,b can be hingedly coupled to the ledge portions 614a,b by a pair of ledge hinges 616a,b, respectively. The hinges 612a,b,616a,b can extend across each of the panels 606a,b,c,d.

The wrap liner blank 600 can define outer hinges 608a,b,c, which can hingedly couple adjacent panels 606a,b,c,d together at the outer portions 618a,b. The outer hinges 608a,b,c can extend through both outer portions 618a,b. The wrap liner blank 600 can define ledge clearance notches 622, which can separate the ledge portions 614a,b defined by adjacent panels 606a,b,c,d, as demonstrated for second ledge portion 614b between adjacent panels 606c,d. The wrap liner blank 600 can define inner clearance notches 620, which can separate the inner portions 610 defined by adjacent panels 606a,b,c,d, as demonstrated between adjacent panels 606c,d. In the present aspect, the wrap liner blank 600 can comprise inner side flaps, such as inner side flaps 660a,b shown hingedly coupled to panel 606c by side hinges 662a,b.

The inner side flaps 660a,b can extend across all or part of the inner clearance notches 620. In the present aspect, inner side flaps 660a,b form a gap with the ledge portions 614a,b. This gap provides clearance for an insulated panel portion 1630 (show in FIG. 16) of a pair of plugs 1601 (shown in FIGS. 16 and 23). In the present aspects, the inner side flaps 660a,b can extend to the adjacent panels 606b,d, and the inner side flaps 660a,b can be separated from the adjacent panels 606b,d by clearance cuts 664a,b. In the present aspect, panels 606a,c can comprise side flaps while panels 606b,d do not comprise side flaps. In some aspects, side flaps 660b,d can comprise side flaps while panels 606a,c do not comprise side flaps. In some aspects, each panel 606a,b,c,d can each comprise one or more side flaps. In some aspects, each panel 606a,b,c,d can each comprise one panel on one side, such as the right side with respect to the present viewing angle for example and without limitation.

The insulation batt 690 can define a top end 691 and a bottom end 693, with the top end 691 disposed opposite from the bottom end 693. The insulation batt 690 can define an inner side 692 (shown in FIG. 6) and an outer side 792 (shown in FIG. 7). In the present aspect, the insulation batt 690 can comprise an insulation material 696. In some aspects, the insulation material 696 can be a flexible and resilient material.

In the present aspect, the inner side 692 can be a raw side 694, and the outer side 792 can be a finished side 794 (shown in FIG. 7). On the raw side 694, the insulation material 696 can be exposed, and on the finished side 794, the insulation material can be covered, such as by backing sheet 796 (shown in FIG. 7). In some aspects, both the inner side 692 and the outer side 792 can be finished sides 794 wherein the insulation material is covered. In some aspects, the insulation material 696 can be fully encapsulated, such as by one or more backing sheets 796 that can be fully wrapped around the insulation material 696.

Figure 8:
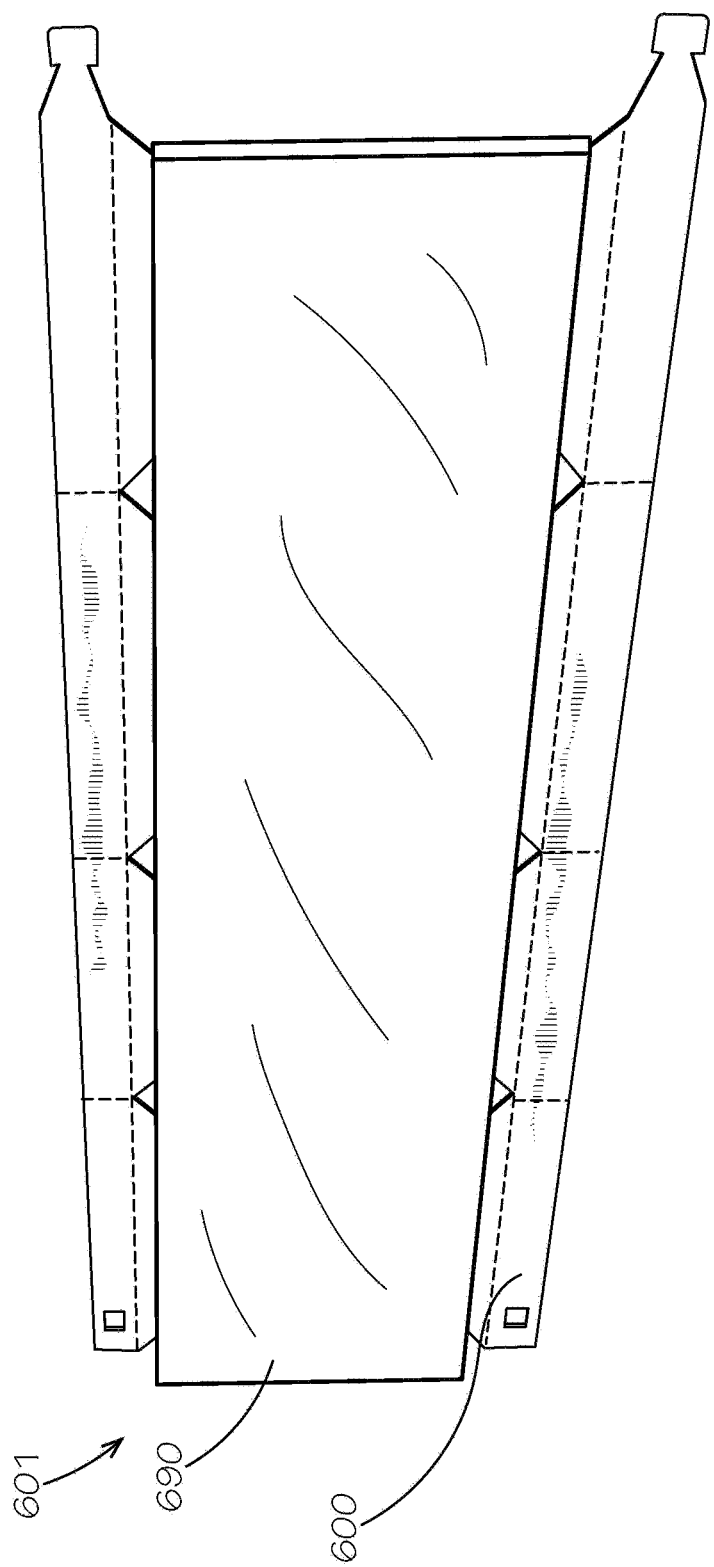
FIG. 8 is a top perspective view of the insulation wrap of FIG. 6 in the unassembled configuration with the insulation wrap placed on an inner portion of the wrap liner blank.
Figure 9:
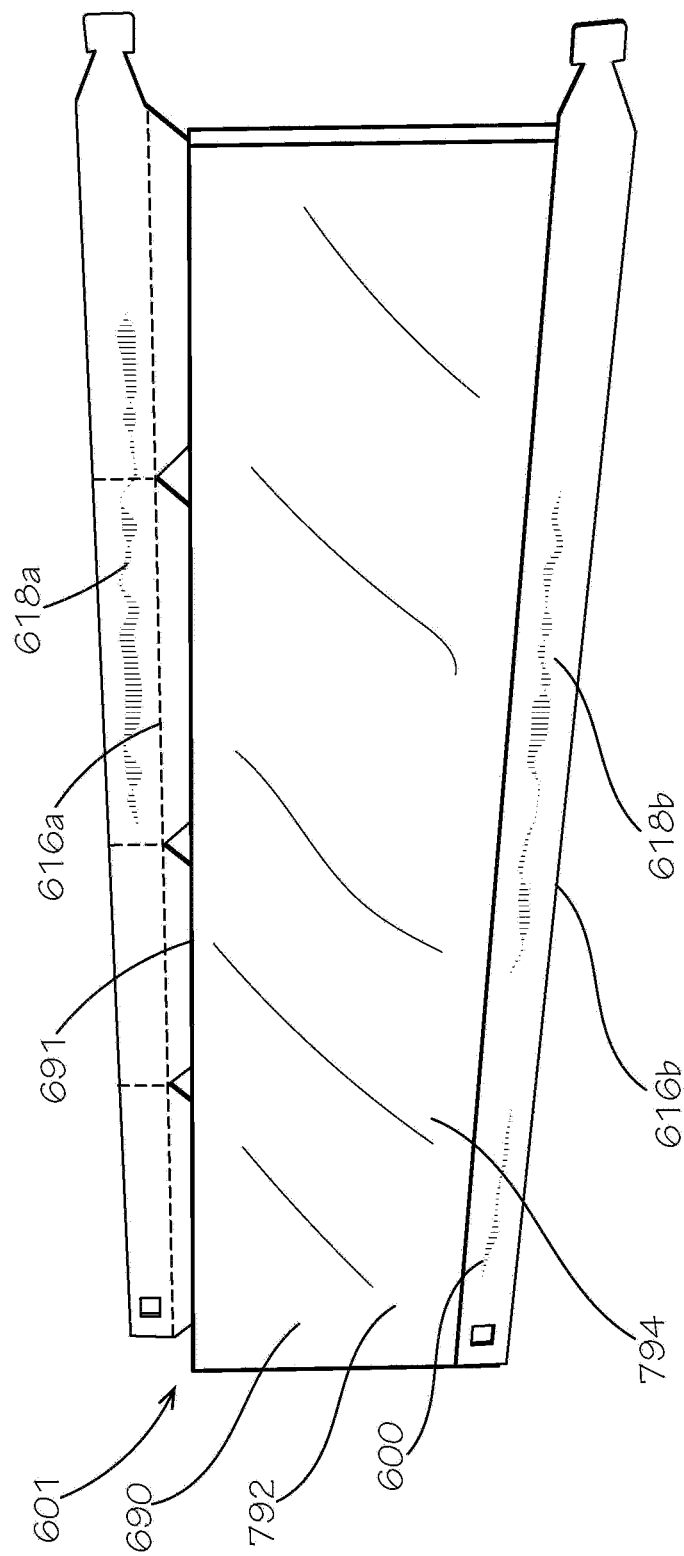
FIG. 9 is a top perspective view of the insulation wrap of FIG. 6 in a partially assembled configuration.

FIG. 8 is a top perspective views of the insulation wrap 601 of FIG. 6 in the unassembled configuration. FIG. 9 is a top perspective view of the insulation wrap 601 of FIG. 6 in a partially assembled configuration. To reconfigure the insulation wrap 601 to the assembled configuration (shown in FIGS. 10 and 11), the insulation batt 690 can be positioned on the inner portion 610 (shown in FIG. 6) of the wrap liner blank 600, as shown in FIG. 8. As shown in FIG. 9 and similarly described in steps 201,203 with respect to FIG. 2, the wrap liner blank 600 can be folded about the inner hinges 612a,b (shown in FIG. 6) and the outer hinges 616a,b from the unassembled configuration to the assembled configuration, so that the top end 691 and the bottom end 693 (shown in FIG. 6) can be captured in channels respectively defined between the inner portion 610 (shown in FIG. 6) and the outer portions 618a,b, respectively, similar to channel 320 shown in FIG. 3. The outer portions 618a,b can be coupled to the outer side 792, such as with tape, an adhesive, or any other suitable means.

In aspects wherein the insulation batt 690 defines the raw side 694 and the finished side 794, the raw side 694 can be positioned facing the inner portion 610. In some aspects, the raw side 694 can be positioned in facing engagement with the inner portion 610, and the raw side 694 can be coupled to the inner portion 610, such as with an adhesive for example and without limitation. By securing the raw side 694 to the inner portion 610, dust, loose fibers, and other particles coming from the insulation batt 690 can be minimized through containment between the wrap liner blank 600 and the backing sheet 796. Additionally, the backing sheet 796 can provide dimensional stability to the insulation batt 690 while being easily foldable.

Figure 10:
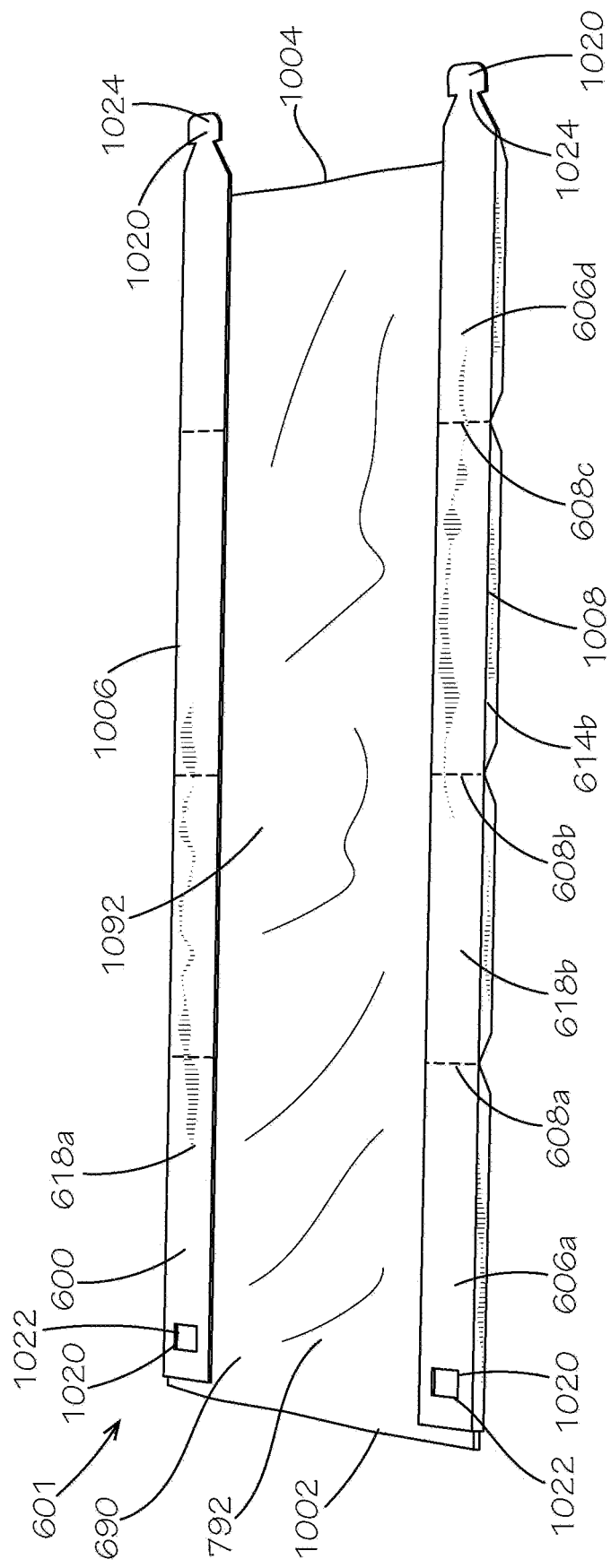
FIG. 10 is a rear perspective view of the insulation wrap of FIG. 6 in an assembled and unfolded configuration.

FIG. 10 is a rear perspective view of the insulation wrap 601 of FIG. 6 in the assembled and unfolded configuration. The outer side 792 of the insulation batt 690 and the outer portions 618a,b of the wrap liner blank 600 can define an outer surface 1092 of the insulation wrap 601. The insulation wrap 601 can define a first end 1002 and a second end 1004. The first end 1002 can be defined opposite from the second end 1004. The insulation wrap 601 can define a top end 1006 and a bottom end 1008. The top end 1006 can be defined opposite from the bottom end 1008. The top end 1006 can be defined by first ledge portion 614a (shown in FIG. 6), and the bottom end 1008 can be defined by second ledge portion 614b.

The outer hinges 608a,b,c can be defined by the outer surface 1092 of the insulation wrap 601. The insulation wrap 601 can be configured to fold about the outer hinges 608a, b,c into the folded configuration (shown in FIG. 13). By folding about the outer hinges 608a,b,c, tensile stresses along the outer surface 1092 of the insulation wrap 601 can be minimized. Minimization of tensile stresses through the outer surface 1092 can be desirable because tensile stress in the outer surface 1092 can cause the insulation wrap 601 to pull away from the outer portions 618a,b of the wrap liner blank 600 and/or cause tears in the insulation batt 690 and the backing sheet 796. Tears in the insulation batt 690 and backing sheet 796 can compromise the insulating performance of the insulation batt 690 and lead to excessive production of dust, loose fibers, or other particles from the insulation material 696 (shown in FIG. 6) of the insulation batt 690.

Instead of introducing substantial tensile stresses in the outer surface 1092, mild compressive stresses can be exerted on the inner side 692 (shown in FIG. 6) of the insulation batt 690 during folding, which can be resisted in part by the inner side 692 of the insulation batt 690 being coupled to the inner portion 610 of the wrap liner blank 600. This arrangement controls the thicker, flexible insulation batt 690 to minimize wrinkles and/or buckling along the inner side 692 and to ensure that the insulation batt 690 moves together with the thinner, rigid wrap liner blank 600. The design involving folding of the insulation wrap 601 through the outer hinges 608a,b,c resulted from results achieved through multiple experiments in folding composite insulation materials.

In the folded configuration, the first end 1002 can be positioned adjacent to the second end 1004, and the insulation wrap 601 can define a substantially rectangular or square cross-sectional shape when viewed from the top end 1006 or the bottom end 1008. A closure mechanism 1020 can be configured to secure the first end 1002 to the second end 1004 in the folded configuration. In the present aspect, the closure mechanism 1020 can be comprised by the insulation wrap 601. Specifically, the closure mechanism 1020 can be comprised by the wrap liner blank 600. More specifically, the closure mechanism 1020 can be defined by the outer portions 618a,b.

In the present aspect, the closure mechanism 1020 can comprise a pair of apertures 1022 defined by panel 606a at the first end 1002 and a pair of tabs 1024 defined by panel 606d at the second end 1004. The tabs 1024 can each define a barbed shape that is wider than the corresponding apertures 1022.

Figure 11:
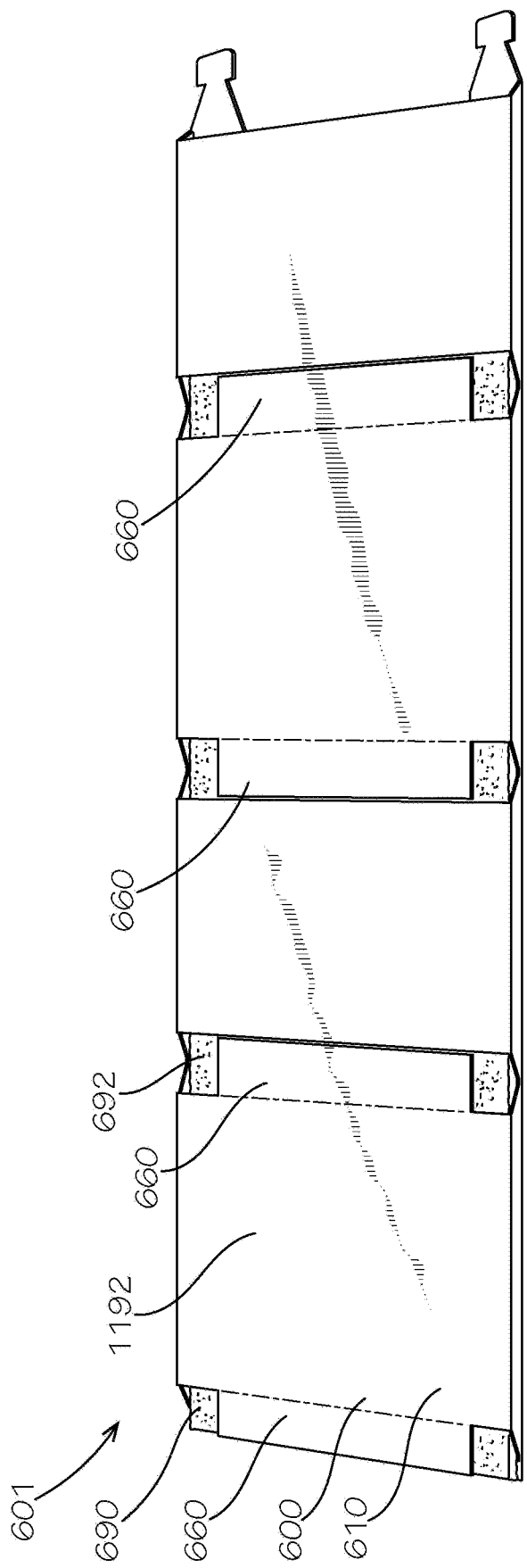
FIG. 11 is a front perspective view of the insulation wrap of FIG. 6 in the assembled and unfolded configuration.

FIG. 11 is a front perspective view of the insulation wrap 601 of FIG. 6 in the assembled and unfolded configuration. The inner portion 610 and the inner side flaps 660 of the wrap liner blank 600 and the inner side 692 of the insulation batt 690 can define an inner surface 1192 of the insulation wrap 601 in the assembled and unfolded configuration. However, as demonstrated by FIG. 13, the insulation batt 690 can be mostly or completely concealed from the inner surface 1192 when the insulation wrap 601 is folded to the folded configuration.

Figure 29:
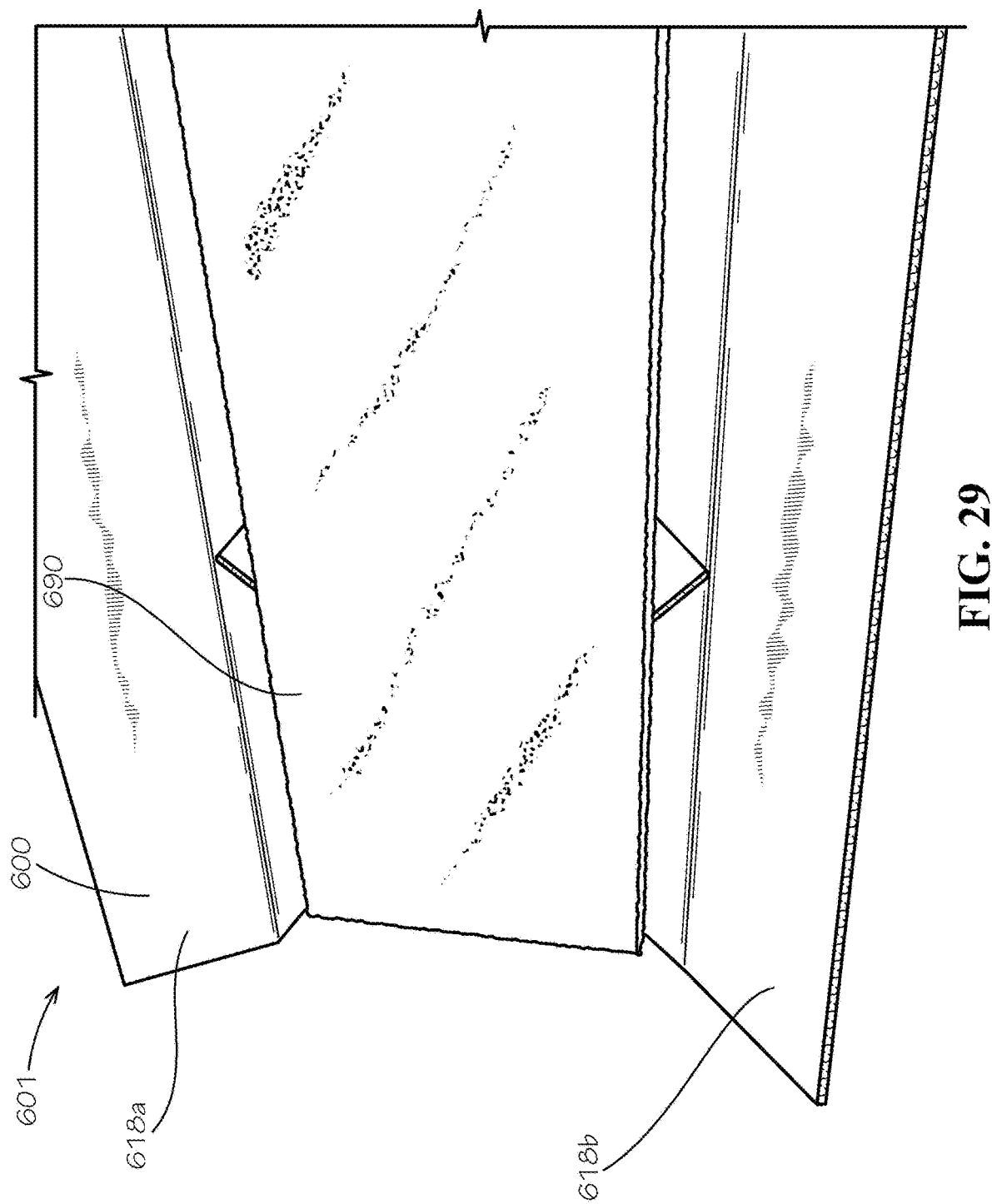
FIG. 29 is a top perspective view of an insulation wrap in accordance with another aspect of the present disclosure comprising the insulation batt of FIG. 6 and another aspect of the wrap liner blank in the unassembled configuration.
Figure 30:
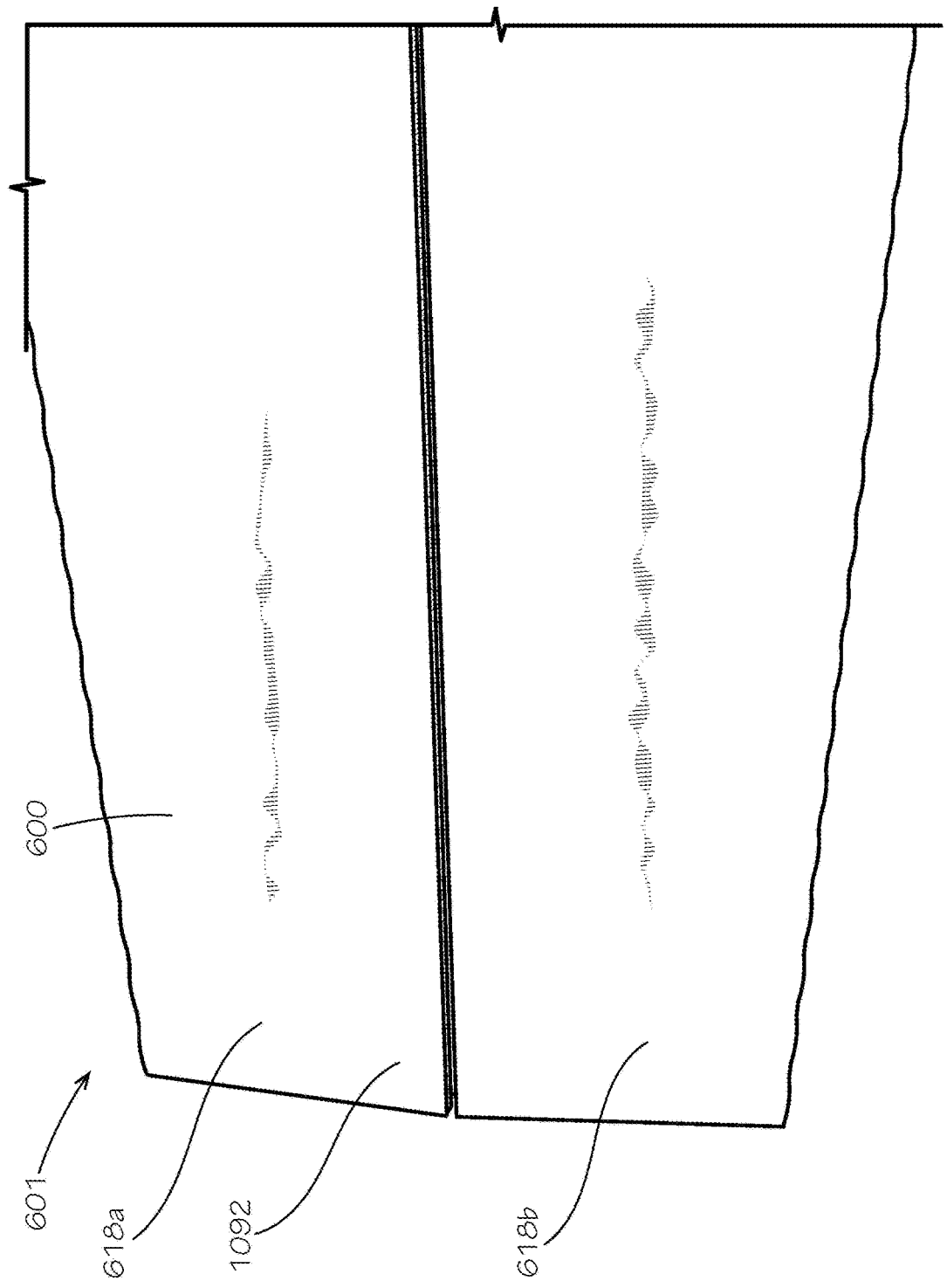
FIG. 30 is a top perspective view of the insulation wrap of FIG. 29 with the wrap liner blank enclosing the outer side in a partially assembled configuration.
Figure 31:
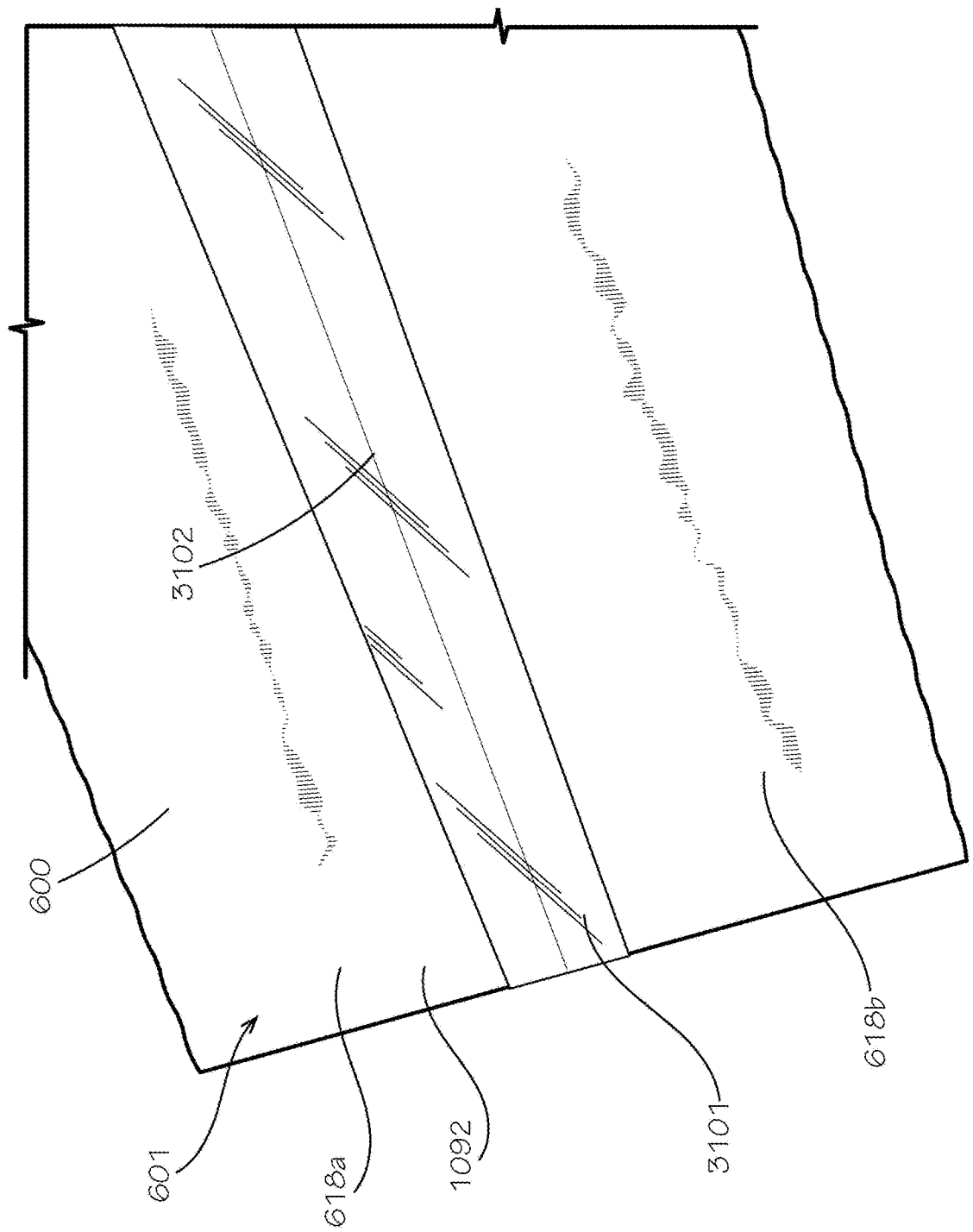
FIG. 31 is top perspective view of the outer side of the insulation wrap of FIG. 29 in the assembled and unfolded configuration.
Figure 32:
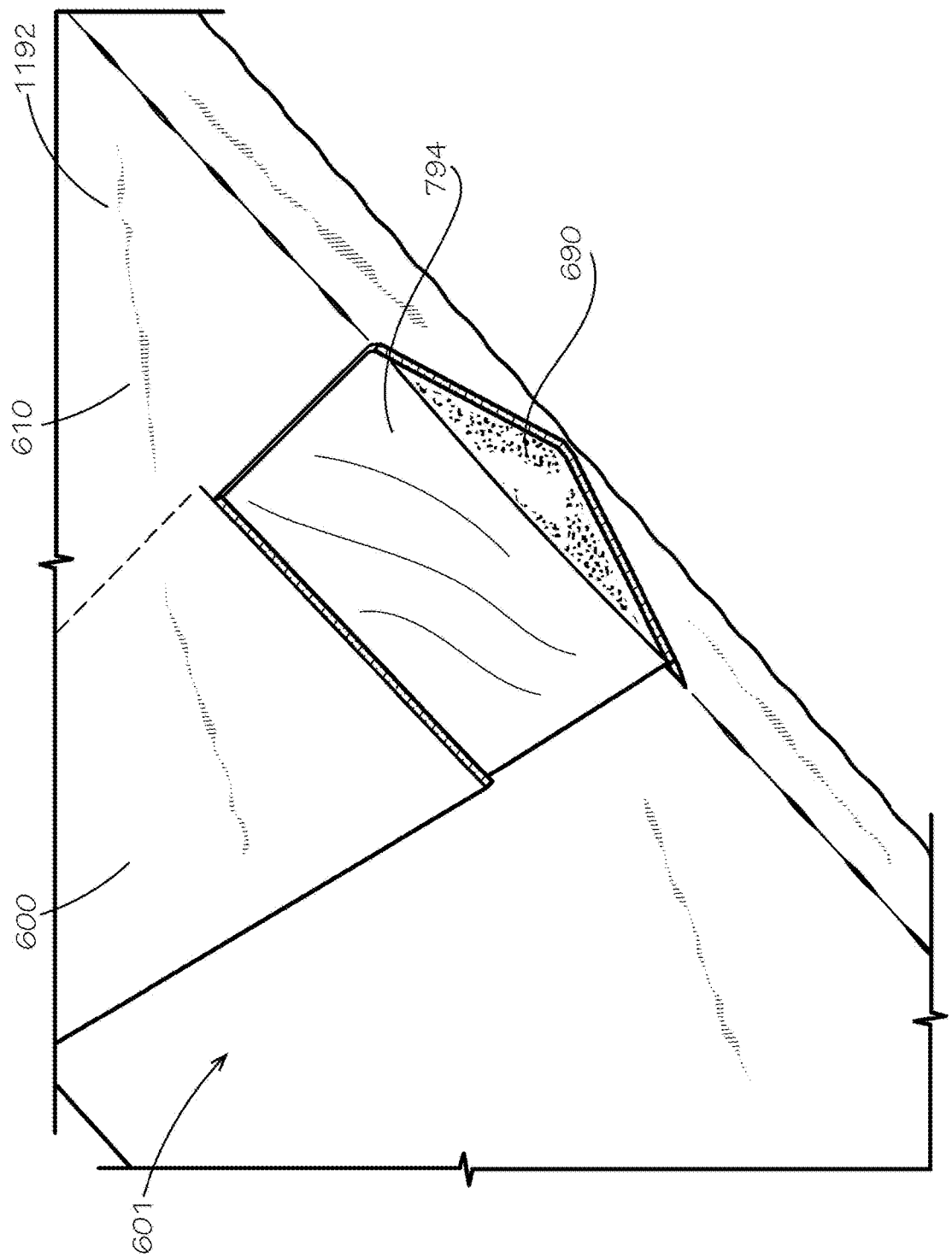
FIG. 32 is a detailed view of the inner surface of the insulation wrap of FIG. 29 in the assembled and unfolded configuration.

FIGS. 29-32 show another aspect of the insulation wrap 601 in accordance with another aspect of the present disclosure. FIG. 29 is a top perspective view of the insulation wrap 601 comprising the insulation batt 690 of FIG. 6 positioned on another aspect of the wrap liner blank 600 in the unassembled configuration. FIG. 30 is a top perspective view of the insulation wrap 601 of FIG. 29 with the wrap liner blank 600 enclosing the insulation batt 690 (not shown) on the outer surface 1092 in a partially assembled configuration. FIG. 31 is a top perspective view of the outer surface 1092 of the insulation wrap 601 of FIG. 29 in the assembled and unfolded configuration. FIG. 32 is a detailed view of the inner surface 1192 of the insulation wrap 601 of FIG. 29 in the assembled and unfolded configuration.

The wrap liner blank 600 of FIG. 29 can be similar to the wrap liner blank 600 of FIG. 6, but with extended outer portions 618a,b that are configured to be coupled together, as shown in FIG. 31. In FIG. 31, the outer portions 618a,b can be coupled together by a tape strip 3101. As shown, the tape strip 3101 can extend down a seam 3102 defined between adjacent edges of the outer portions 618a,b. In other aspect, one or more tape strips 3101 can be coupled to the outer portions 618a,b in a different orientation, such as transverse to the seam 3102 rather than parallel to the seam 3102. In other aspects, a different coupling mechanism, such as an adhesive, mechanical fasteners such as staples, or any other suitable fastener or fastening means can be utilized to couple the outer portions 618a,b together.

In the present aspect, the outer portions 618a,b can fully enclose the insulation batt 690 (shown in FIG. 29) on the outer surface 1092, thereby covering the outer side 792 (shown in FIG. 7) of the insulation batt 690. The outer portions 618a,b may contact one another at the seam 3102, or a gap can be defined at the seam 3102. In some aspects, particularly those where the outer portions 618a,b fully enclose the insulation batt 690 on the outer side 792 (shown in FIG. 7), it may be desirable to reverse the orientation of the insulation batt 690 so that the finished side 794 faces the inner portion 610, as shown in FIG. 32. This arrangement can reduce exposure of the insulation material on the inner portion 610, which can reduce the production of dust, particles, and loose fibers escaping through the inner portion 610, particularly in the assembled and unfolded configuration.

Figure 12:
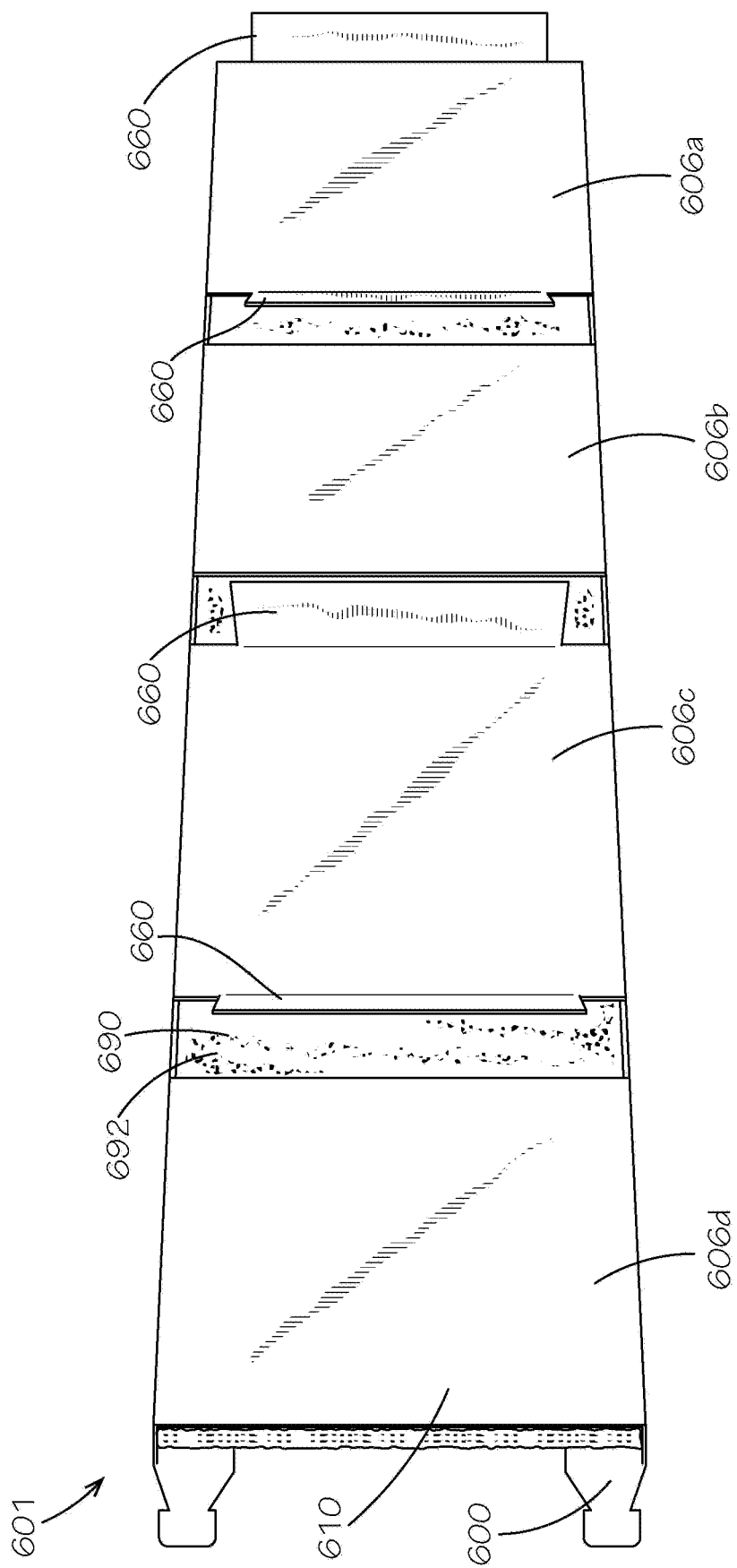
FIG. 12 is a front perspective view of the insulation wrap of FIG. 6 in the assembled and unfolded configuration with inner side flaps of the wrap liner blank folded upwards and away from the insulation batt.

Returning to FIG. 12, prior to folding the insulation wrap 601 about the outer hinges 608a,b,c (shown in FIG. 10), the inner side flaps 660 can be folded upwards and away from the inner side 692 of the insulation batt 690. While not necessary, this step can help prevent interference between the inner side flaps 660 and the inner portions 610 of the panels 606a,b,c,d.

Figure 13:
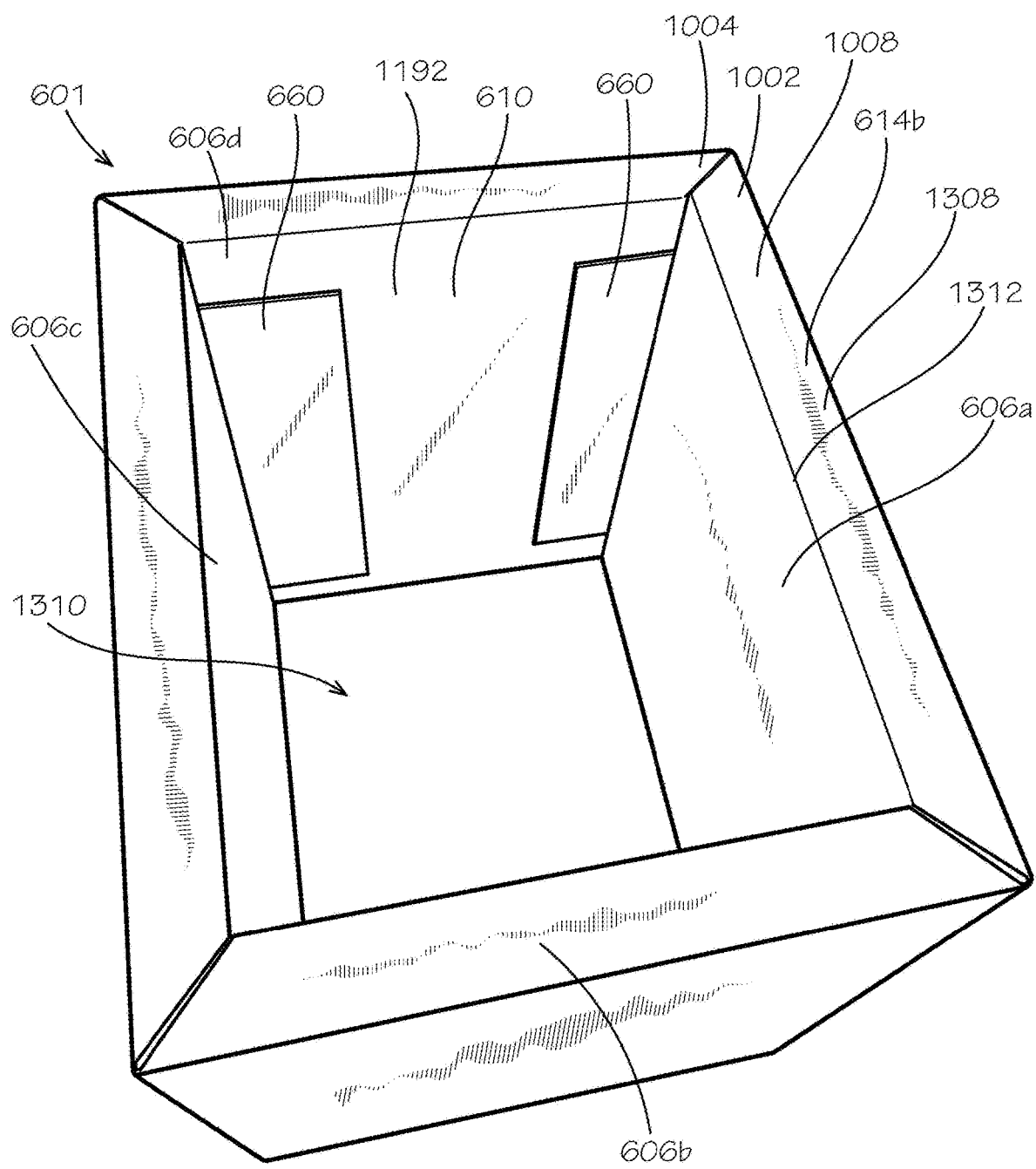
FIG. 13 is a bottom perspective view of the insulation wrap of FIG. 6 in a folded configuration.

FIG. 13 is a bottom perspective view of the insulation wrap 601 of FIG. 6 in the folded configuration. The insulation wrap 601 can define an insulated cavity 1310, which can be at least partially enclosed by the inner surface 1192 of the insulation wrap 601. The second ledge portion 614b can define a bottom ledge 1308 at the bottom end 1008 of the insulation wrap 601, and the bottom ledge 1308 can define a bottom opening 1312 to the insulated cavity 1310. As shown, the inner side flaps 660 can overlap the adjacent inner portion 610 of panels 606a,d. This arrangement can prevent dust, fibers, and other particles from the insulation batt 690 (shown in FIG. 16) from entering the insulated cavity 1310 by sealing seams in the inner surface 1192.

In the present aspect, 45-degree mitered joints can be formed at all of the corners between panels 606a,b,c,d, including where the first end 1002 joins the second end 1004.

Figure 14:
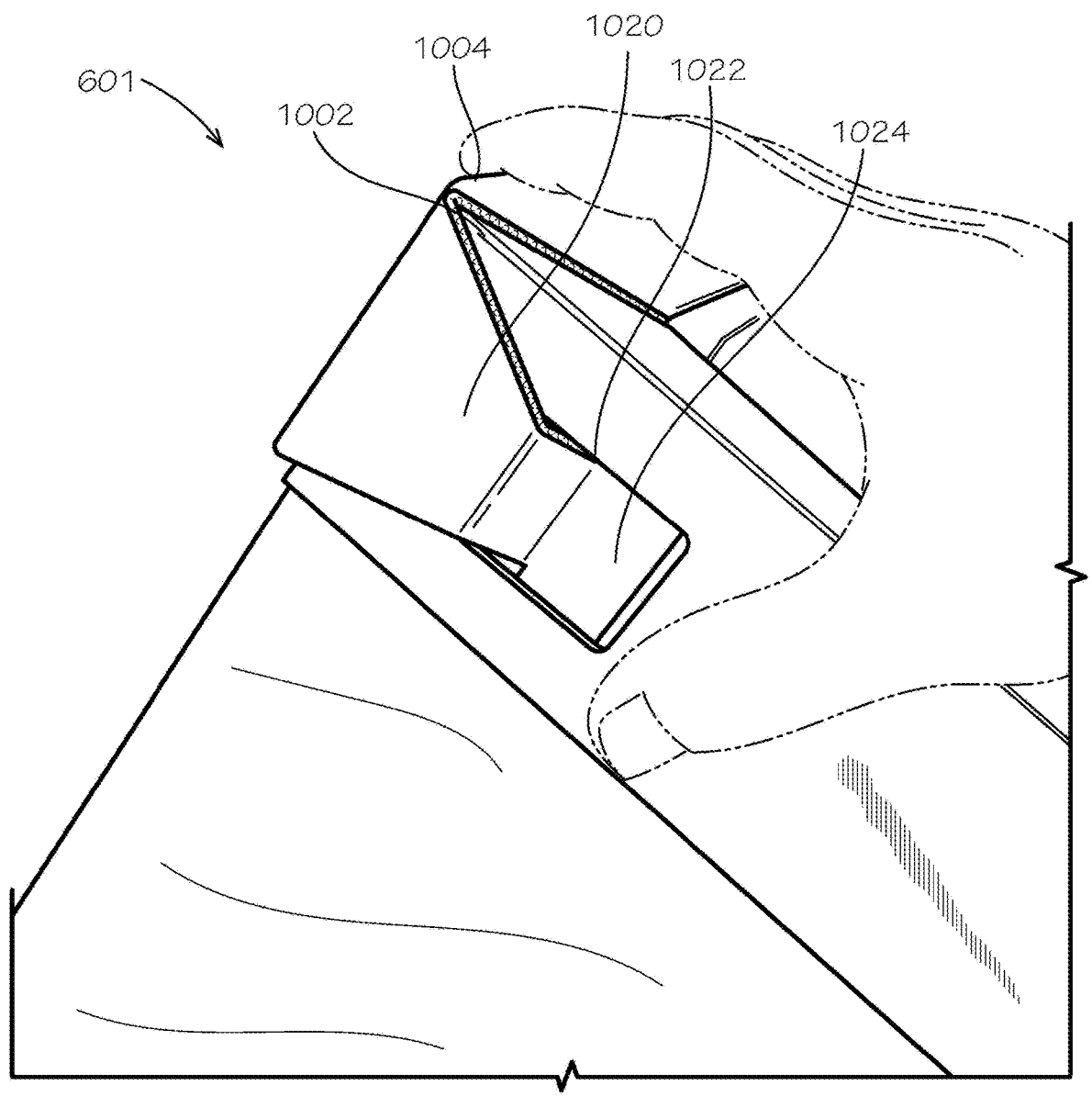
FIG. 14 is a detailed view of a closure mechanism of the insulation wrap of FIG. 6.

FIG. 14 is a detailed view of the closure mechanism 1020 of the insulation wrap 601 of FIG. 6. The tab 1024 can be inserted through the aperture 1022 to secure the first end 1002 to the second end 1004 and to maintain the insulation wrap 601 in the folded configuration. The barbed shape of the tab 1024 can be configured to resist withdrawal of the tab 1024 from the aperture 1022 after the tab 1024 has been inserted through the aperture 1022. The insulation batt 690 (shown in FIG. 6) can be slightly offset from the ends 1002,1004 so that the insulation batt 690 overlaps when the ends 1002,1004 are positioned in contact with one another. In other aspects, the insulation wrap 601 can be configured to form a butt joint where the ends 1002,1004 meet. In such aspects, the first end 1002 can be placed in facing engagement with the inner portion 610 adjacent to the second end 1004, or vice versa.

Figure 15:
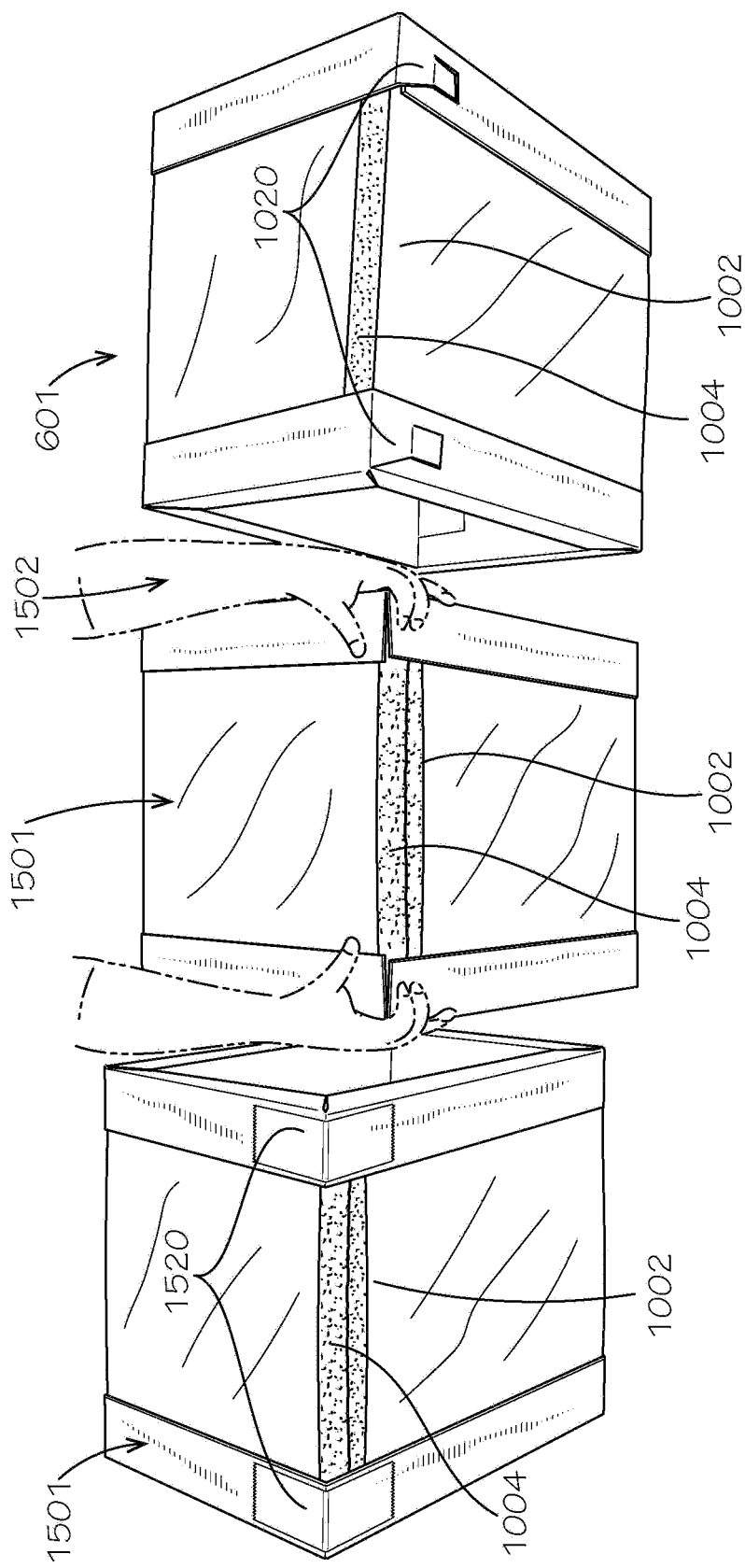
FIG. 15 is a side view of three different aspects of the closure mechanism in accordance with multiple aspects of the present disclosure.

FIG. 15 is side view demonstrating three different aspects of a closure mechanism. On the right, the insulation wrap 601 of FIG. 6 shows another view of closure mechanism 1020 from FIG. 10, which can secure the first end 1002 to the second end 1004. The left and center images show insulation wrap 1501, which can be substantially the same as insulation wrap 601 except that insulation wrap 1501 does not comprise closure mechanism 1020. On the left, a closure mechanism 1520 can demonstrate an aspect of the insulation wrap 1501 where the closure mechanism 1520 can be a separate component from the insulation wrap 1501. For example and without limitation, the closure mechanism 1520 can be tape, staples, twine, wire, straps, or any other suitable mechanism configured to secure the first end 1002 to the second end 1004. In the present aspect, the closure mechanism 1520 can be Kraft paper tape. In the center, the insulation wrap 1501 can depend upon external force to hold the first end 1002 and the second end 1004 together. Here, a worker 1502 is shown holding the insulation wrap 1501 in the folded configuration. Once the insulation wrap 1501 is in the folded configuration, the worker 1502 can then position the insulation wrap 1501 within a cavity of a complimentarily shaped box, which can secure the insulation wrap 1501 in the folded configuration.

Figure 16:
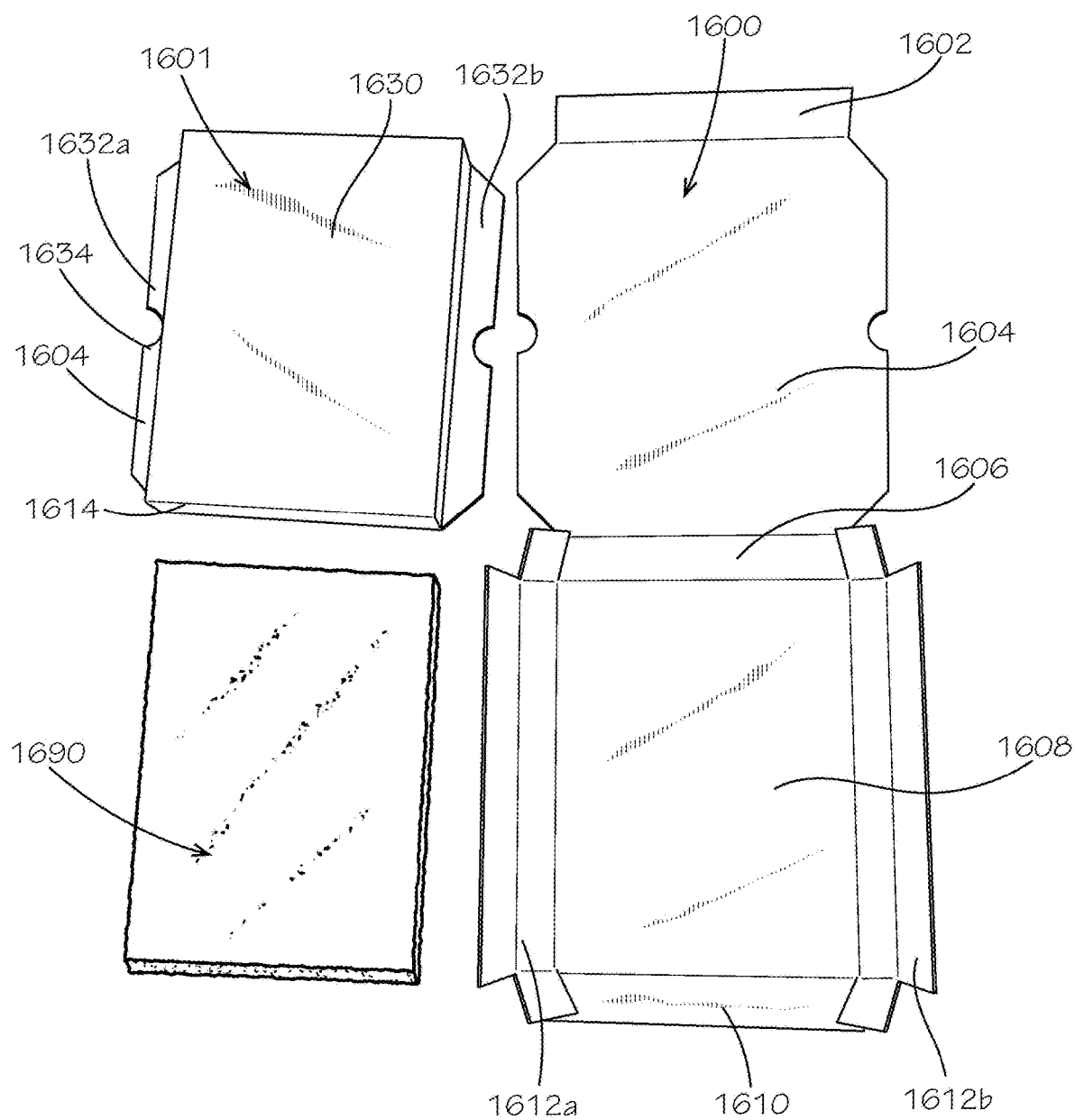
FIG. 16 is a top perspective view of a plug comprising a plug blank and a plug insulation batt in accordance with another aspect of the present disclosure.
Figure 17:
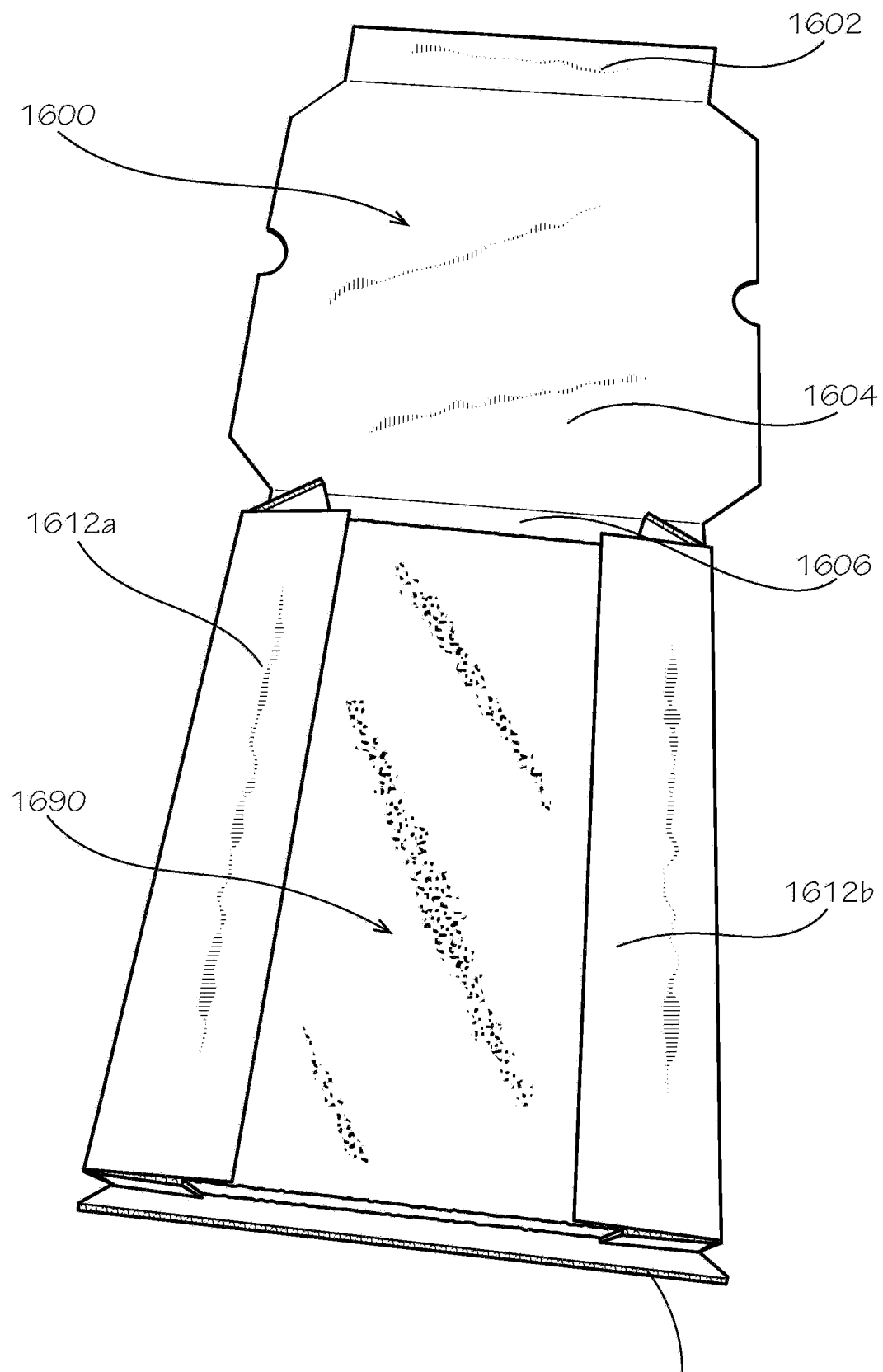
FIG. 17 is a perspective view of the plug of FIG. 16 in a partially assembled configuration.

FIG. 16 is a top perspective view of the plug 1601 comprising a plug blank 1600 and a plug insulation batt 1690 in accordance with another aspect of the present disclosure. As shown in FIG. 17, the plug blank 1600 can be folded around the plug insulation batt 1690 to enclose the plug insulation batt 1690 and form the plug 1601 (shown in FIG. 18).

As shown in FIG. 16, the plug blank 1600 can comprise a first end subpanel 1602, which can be hingedly coupled to an outer panel 1604. A first end panel 1606 can be hingedly coupled to the outer panel 1604 opposite from the first end subpanel 1602. An inner panel 1608 can be hingedly coupled to the first end panel 1606 opposite from the outer panel 1604. A second end subpanel 1610 can be hingedly coupled to the inner panel 1608 opposite from the first end panel 1606. A pair of wing portions 1612a,b can be hingedly coupled to opposite sides of the inner panel 1608 between the first end panel 1606 and the second end subpanel 1610.

Figure 21:
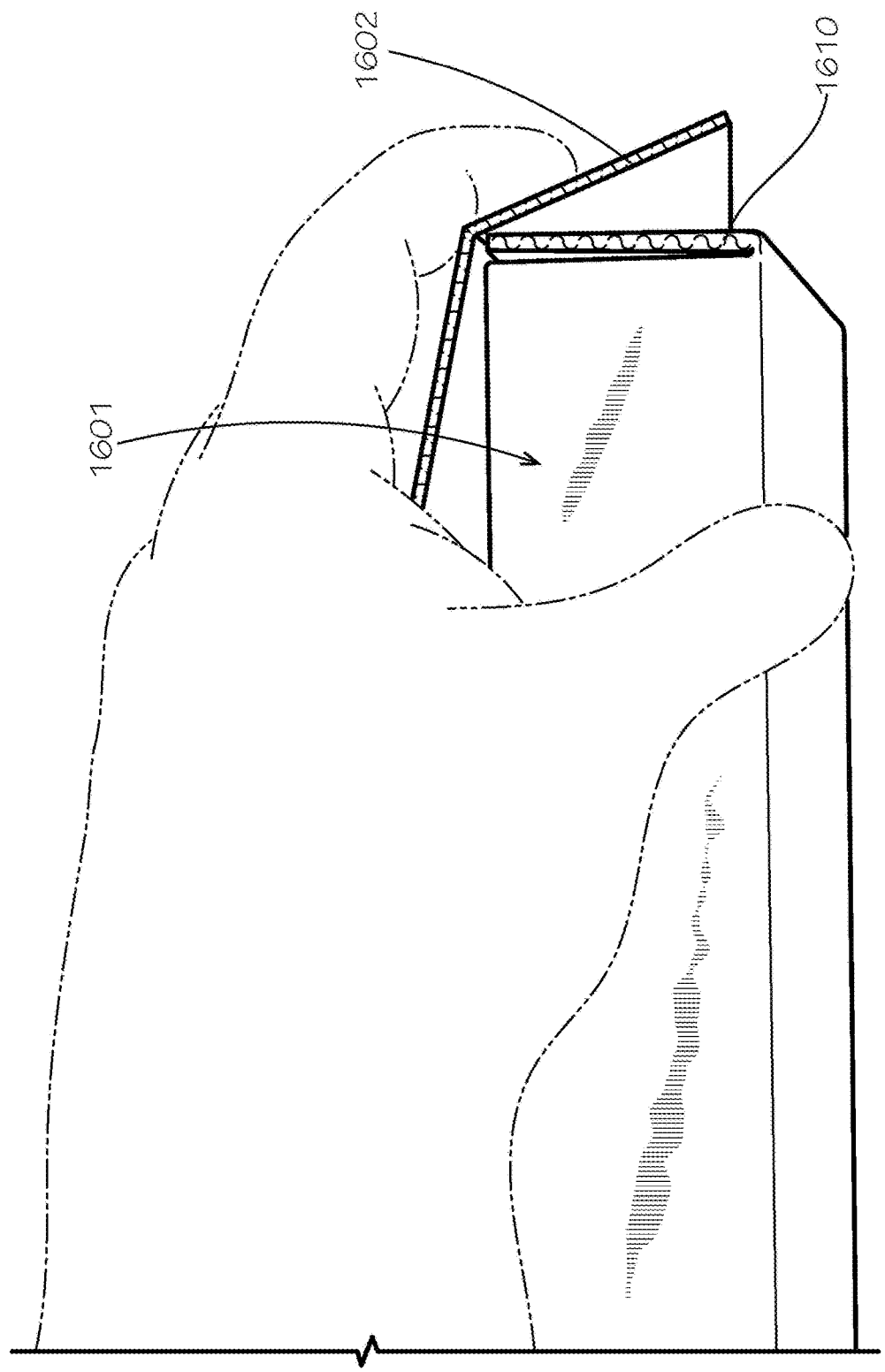
FIG. 21 is a side view of the plug of FIG. 16 demonstrating formation of the second end panel from a first end subpanel and a second end subpanel of the plug blank of FIG. 16.
Figure 22:
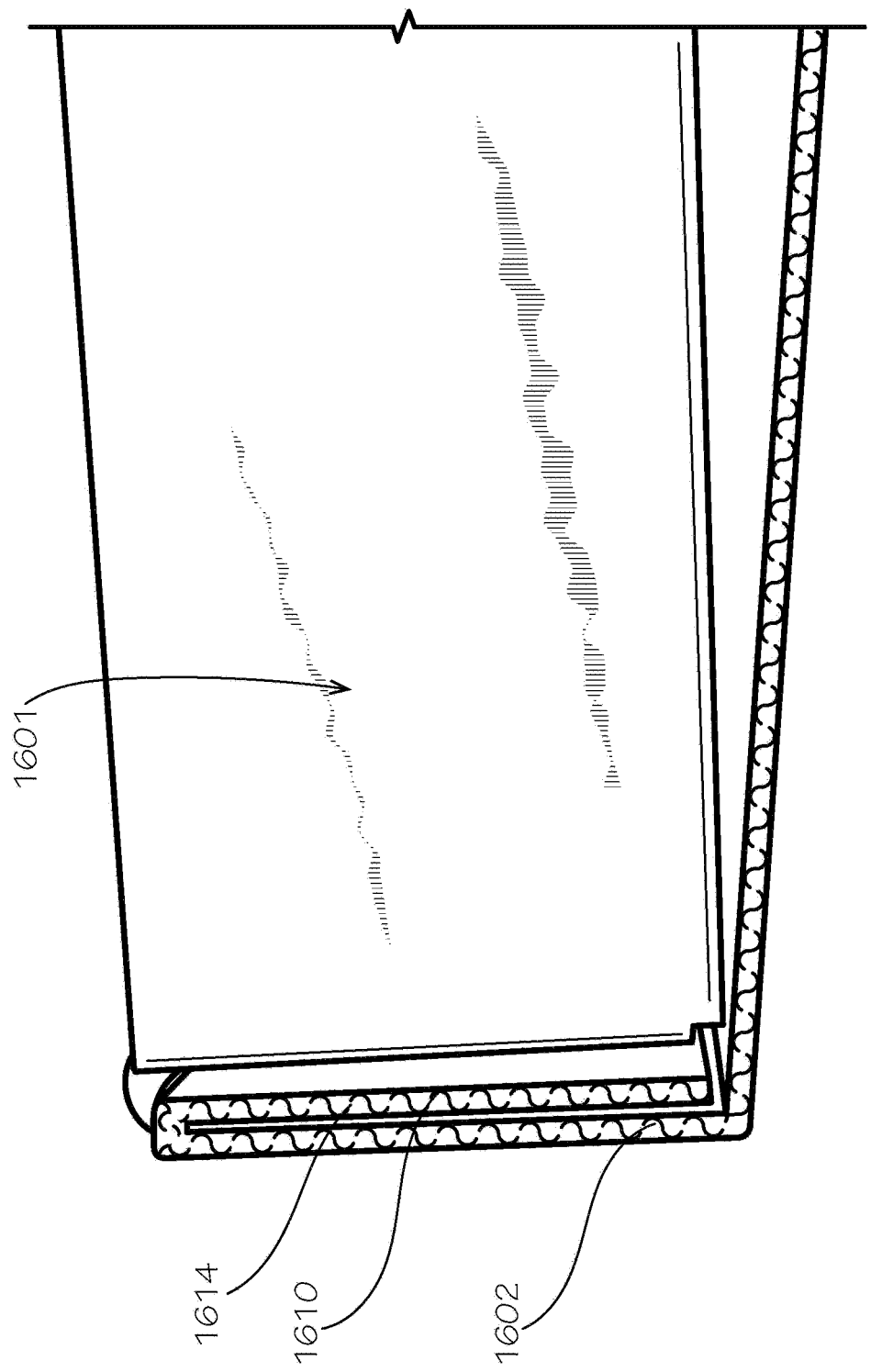
FIG. 22 is a side view of the plug of FIG. 16 demonstrating formation of the second end panel from the first end subpanel and the second end subpanel of the plug blank of FIG. 16.

As shown in FIG. 17, the plug insulation batt 1690 can be positioned on the inner panel 1608. The wing portions 1612a,b can then be wrapped around the plug insulation batt 1690, and the outer panel 1604 can be folded over the plug insulation batt 1690 and wing portions 1612a,b to fully enclose the plug insulation batt 1690. The first end subpanel 1602 can then be coupled to the second end subpanel 1610 to from a second end panel 1614, as shown in FIGS. 21 and 22. The end subpanels 1602,1610 can be secured together with an adhesive, tape, staples, or any other suitable method. With the end subpanels 1602, 1610 secured together to form the second end panel 1614, the plug 1601 can be formed.

As shown in FIG. 16, the plug 1601 can comprise the insulated panel portion 1630, which can hold and enclose the plug insulation batt 1690. A pair of wing portions 1632a,b of the outer panel 1604 can extend outwards from opposite sides of the insulated panel portion 1630. As demonstrated by wing portion 1632a, the wing portions 1632a,b can define finger notches 1634 configured to facilitate removal of the plug 1601 when it is placed in a cavity of a box.

Figure 18:
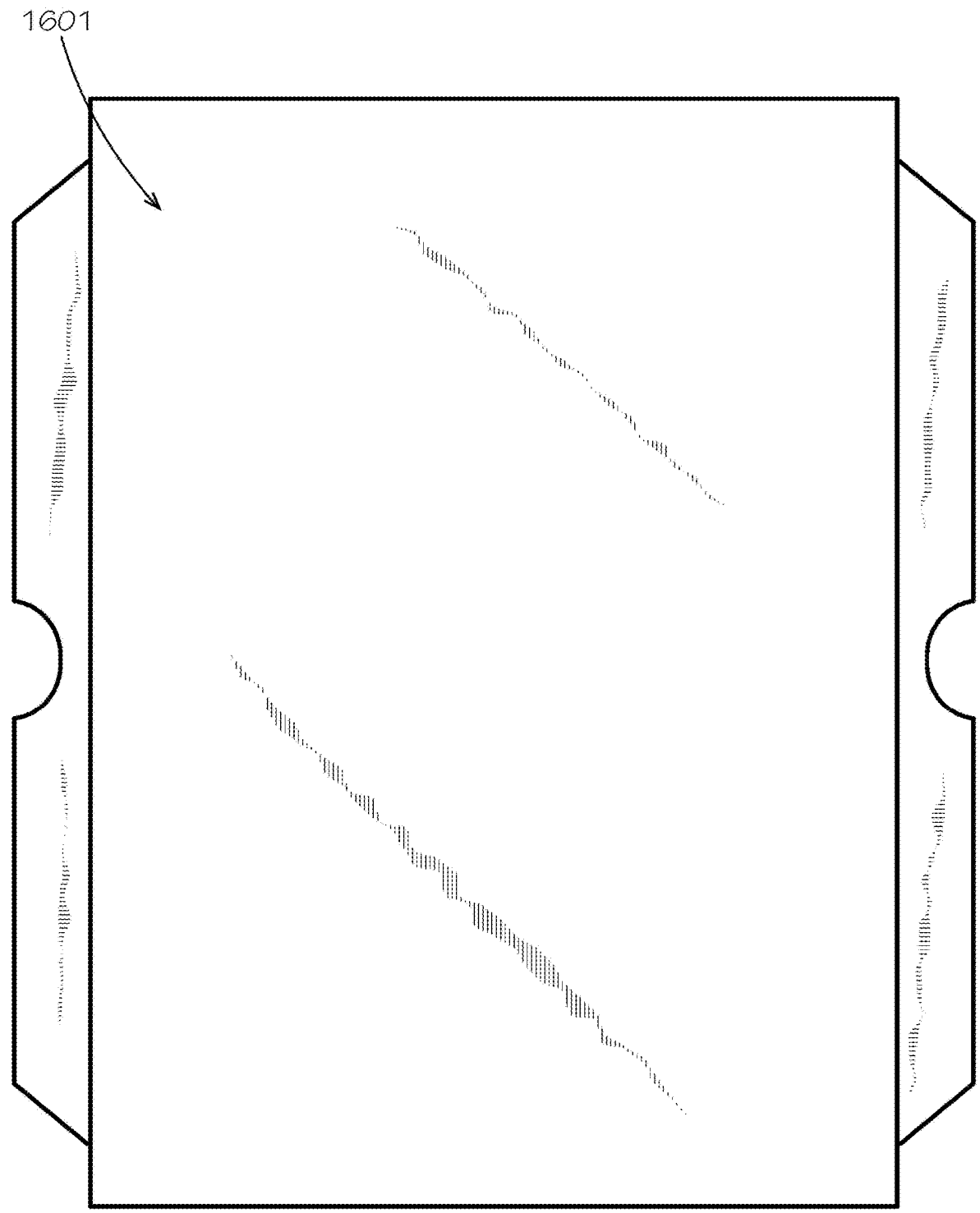
FIG. 18 is a top view of the plug of FIG. 16.
Figure 19:
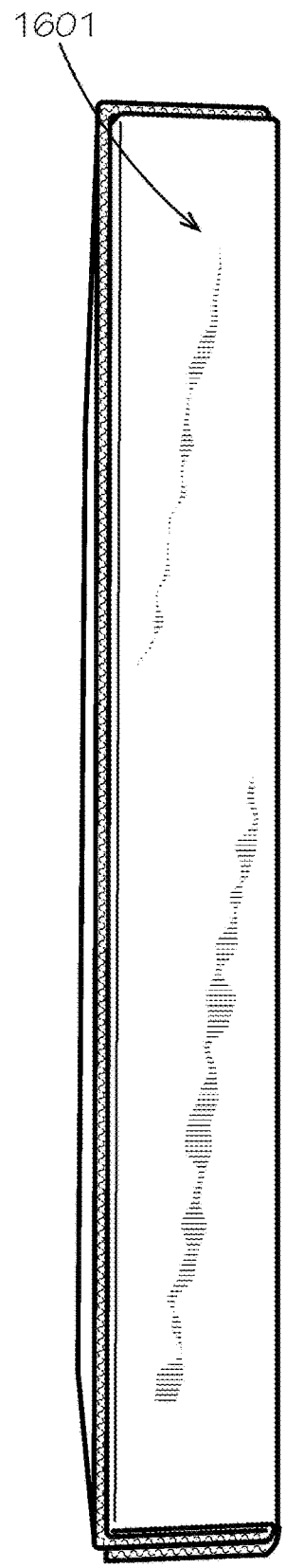
FIG. 19 is a side view of the plug of FIG. 16.
Figure 20:
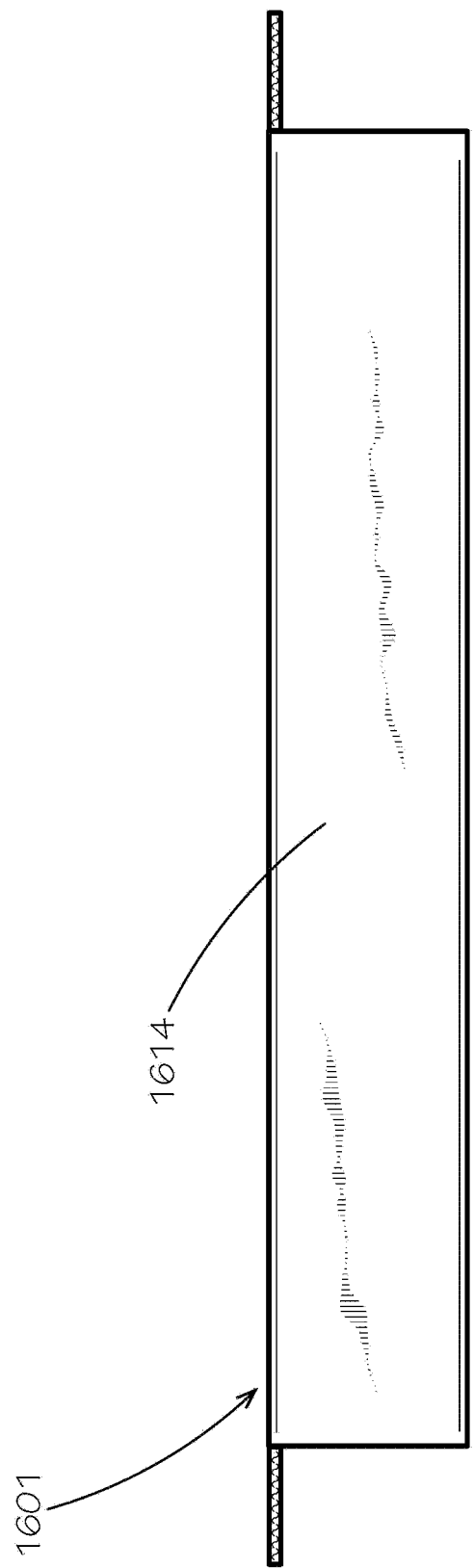
FIG. 20 is an end view of the plug of FIG. 16 showing a second end panel of the plug.

FIG. 18 is a top view of the plug 1601 of FIG. 16. FIG. 19 is a side view of the plug 1601 of FIG. 16. FIG. 20 is an end view of the plug 1601 of FIG. 16, showing the second end panel 1614. FIGS. 21 and 22 are side views of the plug 1601 of FIG. 16 demonstrating the formation of the second end panel 1614 from the end subpanels 1602,1610.

Figure 23:
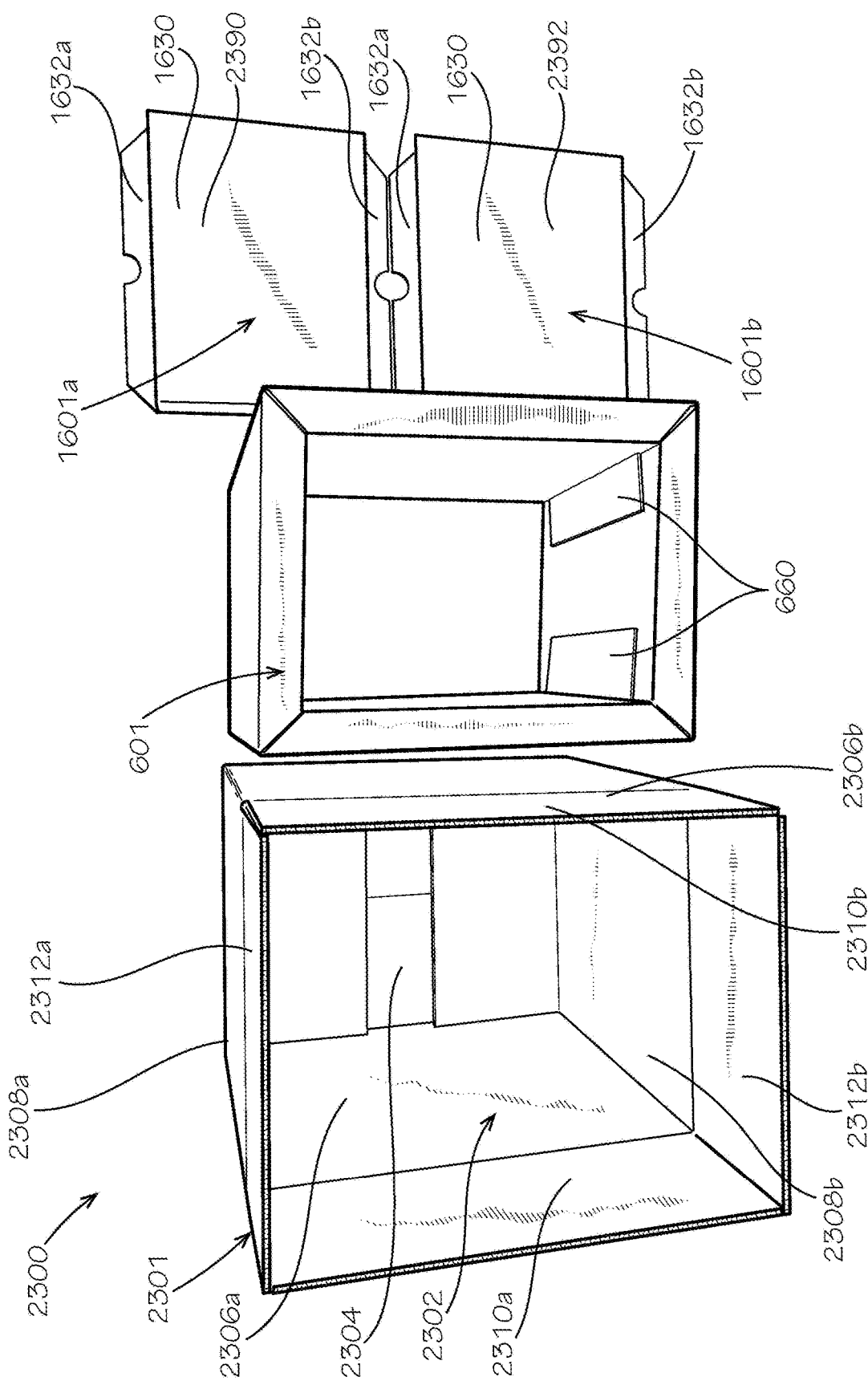
FIG. 23 is an exploded top perspective view of a packaging assembly comprising a box, the insulation wrap of FIG. 6, and two plugs of FIG. 16 in accordance with another aspect of the present disclosure.

FIG. 23 is an exploded top view of a packaging assembly 2300 comprising a box 2301, the insulation wrap 601 of FIG. 6, and two plugs 1601a,b of FIG. 16, in accordance with another aspect of the present disclosure. The box 2301 can comprise a bottom panel 2304, a pair of opposing side panels 2306a,b, a pair of opposing end panels 2308a,b, a pair of top side flaps 2310a,b, and a pair of top end flaps 2312a,b. In the present aspect, the box 2301 can be a regular slotted carton (RSC). In other aspects, the box 2301 can be a different kind of box.

The box 2301 can define a cavity 2302, which can be sized complimentary to the insulation wrap 601, such that when the insulation wrap 601 is positioned within the cavity 2302, the insulation wrap 601 can be positioned in contact with the side panels 2306a,b and the end panels 2308a,b. The box 2301 can be sized and have tolerances set to keep the insulation wrap 601 "squared" (wherein right-angles are formed between adjacent panels 606, as shown in FIG. 13), particularly in aspects of the insulation wrap 601 lacking a closure mechanism 1020,1520, as shown in FIG. 15.

The top side flaps 2310a,b and the top end flaps 2312a,b can be folded to form a top panel (not shown) that encloses the cavity 2302 when the box is in a closed configuration (not shown). The insulation wrap 601 can be roughly equal to a height of the side panels 2306a,b and end panels 2308a,b, and the insulation wrap 601 can increase a stacking strength of the box 2301 when the box 2301 is in the closed configuration by providing additional support between the bottom panel 2304 and the top panel to resist collapse from a load exerted on the top panel.

Figure 24:
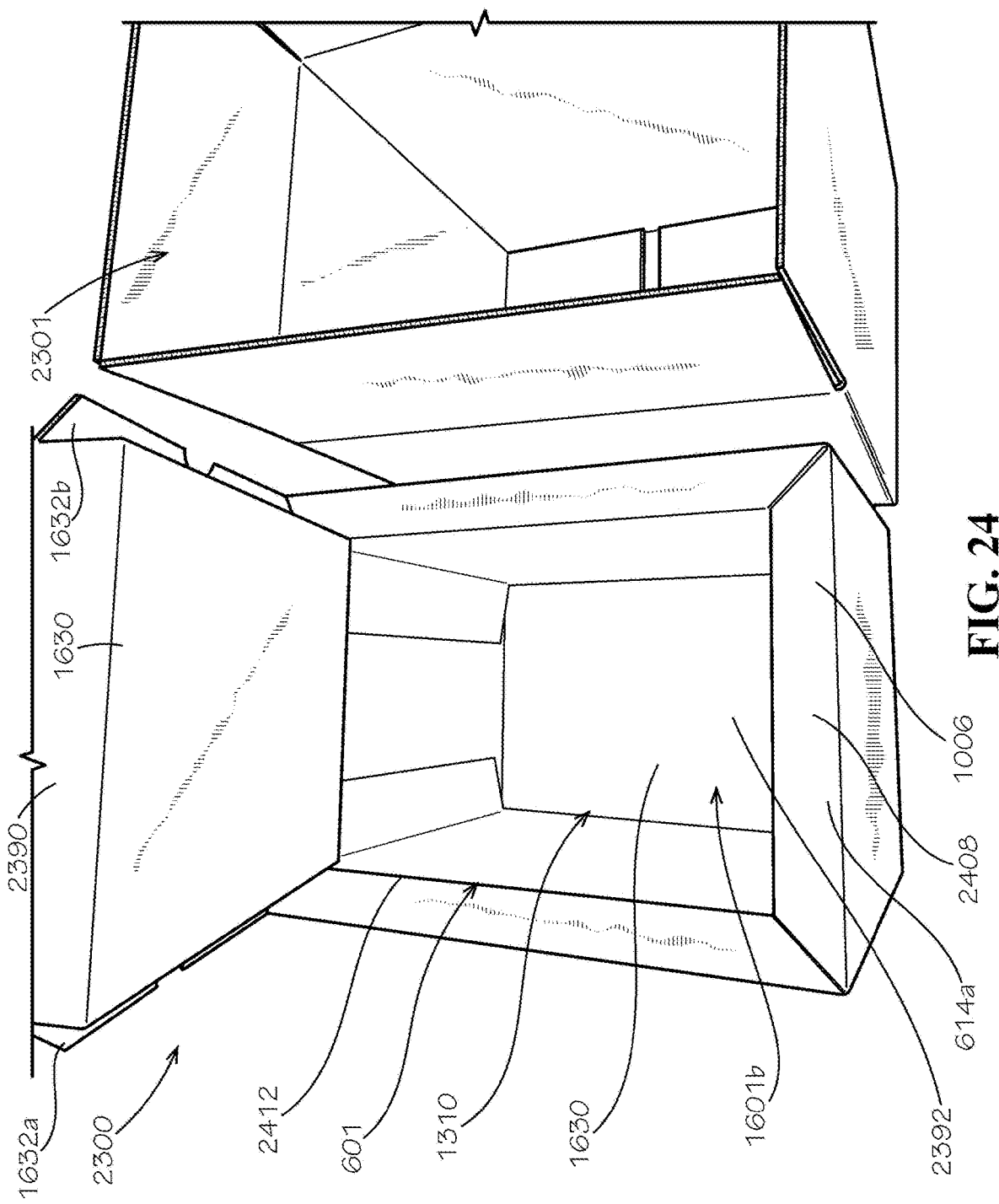
FIG. 24 is a top perspective view of the packaging assembly of FIG. 23 with the plugs partially enclosing an insulated cavity defined within the insulation wrap.

Plug 1601a can be a top plug 2390, and plug 1601b can be a bottom plug 2392. As shown in FIG. 24, the bottom plug 2392 can be positioned with the wing portions 1632a,b in facing engagement with the bottom ledge 1308 (shown in FIG. 13) and the insulated panel portion 1630 insert into the insulated cavity 1310 through the bottom opening 1312 (shown in FIG. 13) of the insulation wrap 601. Accordingly, the bottom plug 2392 can enclose the insulated cavity 1310 at the bottom end 1008 (shown in FIG. 10) of the insulation wrap 601.

Because the insulation batt 1690 (shown in FIG. 16) of the bottom plug 2392 is enclosed by the plug blank 1600 (shown in FIG. 16) of the bottom plug 2392, the insulation batt 1690 (shown in FIG. 16) can be protected from compression by the plug blank 1600. For example and without limitation, if heavy items are placed within the insulated cavity 1310 atop the bottom plug 2392, a rigid nature of the plug blank 1600 can support the items without compressing the insulation batt 1690. Compression of insulation material often reduces the thermal insulation performance of the insulation material. By preventing the compression of the insulation batt 1690, the insulation performance of the bottom plug 2392 can be maintained.

As shown, the insulation batts 690, 1690 can be completely concealed. This arrangement can prevent any dust, loose fibers, or other particles from the insulation batts 690,1690 from accumulating in the insulated cavity 1310. It can also provide an aesthetically pleasing presentation when opened by a receiving individual.

Figure 25:
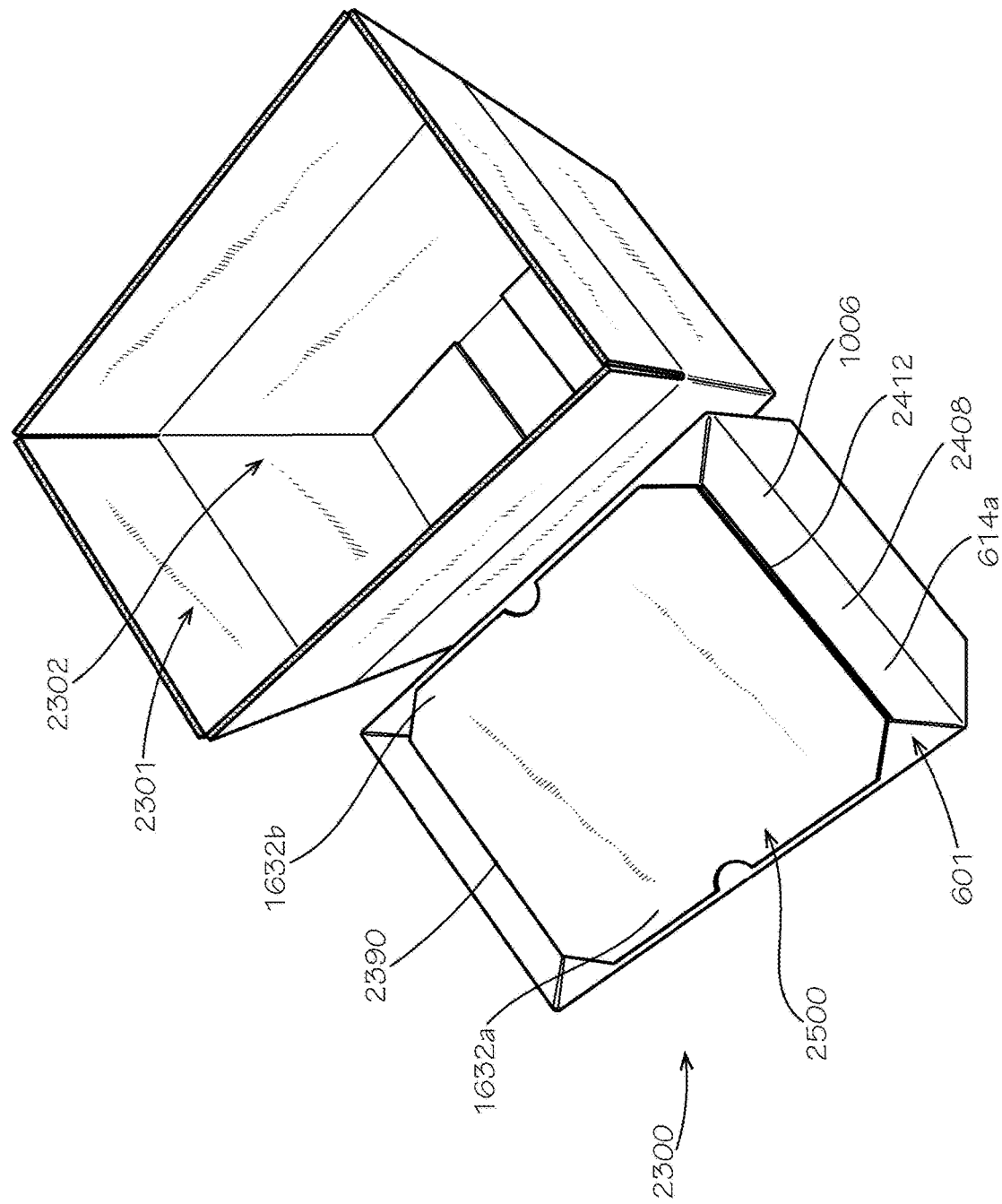
FIG. 25 is a top perspective view of the packaging assembly of FIG. 23 with the plugs fully inserted into the insulation liner and enclosing the insulated cavity to from an insulated core.

The first ledge portion 614a can define a top ledge 2408 at the top end 1006 of the insulation wrap 601. The top ledge 2408 can define a top opening 2412 to the insulated cavity 1310. As shown in FIGS. 24 and 25, the top plug 2390 can be positioned so that the insulated panel portion 1630 can be inserted into the insulated cavity 1310 through the top opening 2412, and the wing portions 1632a,b can be positioned in facing engagement with the top ledge 2408 to enclose the insulated cavity 1310 at the top end 1006 of the insulation wrap 601. The inner side flaps 660 (shown in FIG. 23) do not extend all the way to the top ledge 2408 and the bottom ledge 1308 (shown in FIG. 13) to provide clearance for the insulated panel portions 1630 (shown in FIG. 24) and avoid interference which could result in a weaker seal between the plugs 2390,2392 and the insulation wrap 601.

The top plug 2390, the bottom plug 2392 (shown in FIG. 24), and the insulation wrap 601 can define an insulated core 2500, as shown in FIG. 25. After assembly, the insulated core 2500 can then be placed in the cavity 2302 of the box 2301, and the box 2301 can be closed. In some aspects, the insulated core 2500 can be secured together, such as by fixing the plugs 2390,2392 in place with tape or any other suitable method, before placing the insulated core 2500 in the cavity 2302. In some aspects, frictional engagement between the insulated panel portions 1630 of the plugs 2390,2392 and the respective openings 1312,2412 can couple the plugs 2390,2392 to the insulation wrap 601 and form seals there between.

Figure 26:
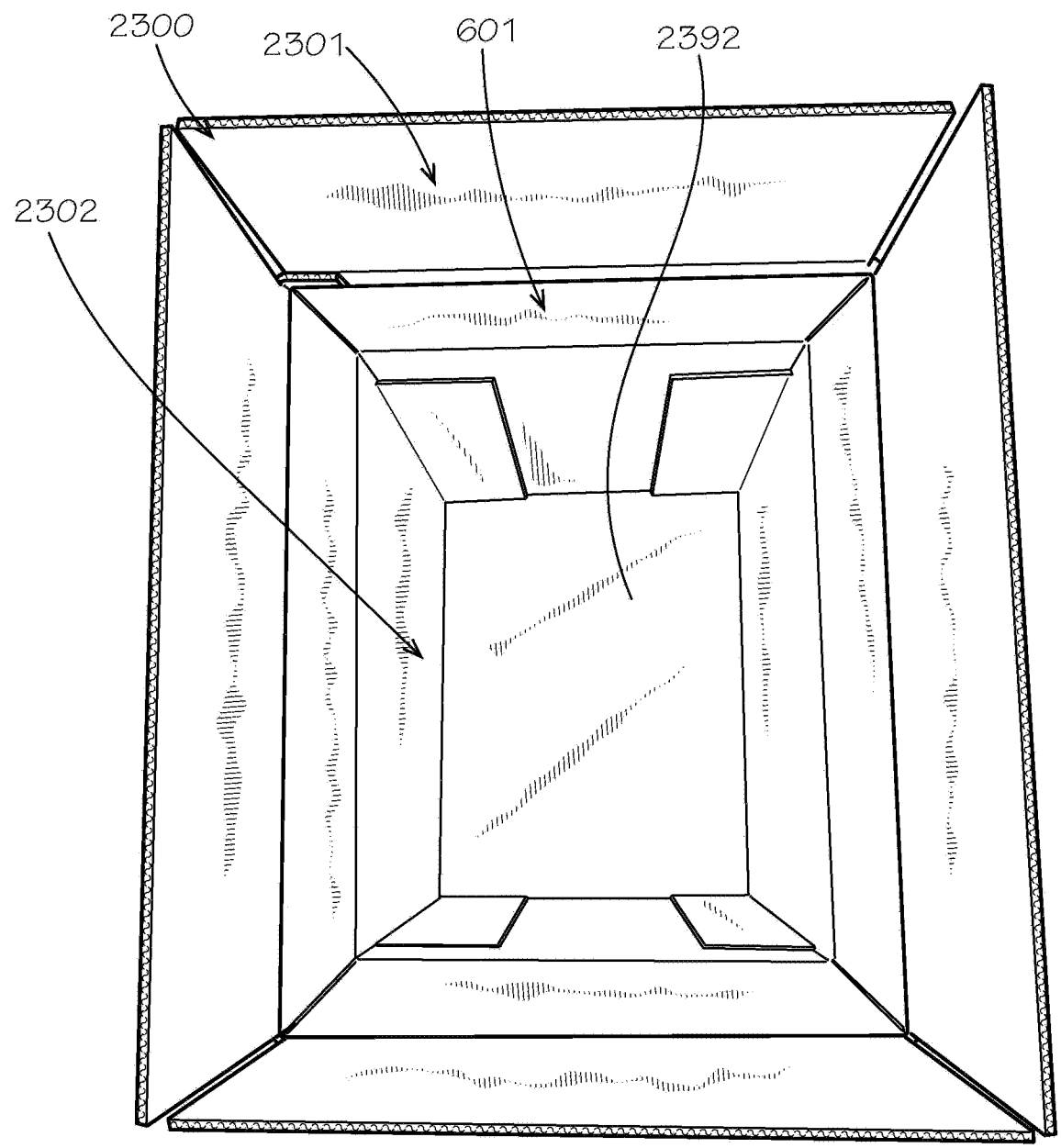
FIG. 26 is a top perspective view of the packaging assembly of FIG. 23 with one plug and the insulation liner of FIG. 6 inserted into a cavity of the box.

Rather than assembling the insulated core 2500 outside of the cavity 2302, the plugs 2390,2392 and insulation wrap 601 can be placed inside the cavity 2302 of the box 2301 to assemble the insulated core 2500 within the cavity 2302, as shown in FIG. 26. For example, the bottom plug 2392 can first be placed in the cavity 2302, then the insulation wrap 601 can be placed in the cavity 2302, and finally the top plug 2390 can be placed in the cavity 2302 to assemble the insulated core 2500. In some aspects, the plugs 2390,2392 can be sized to self-center within the cavity 2302, such as by comprising wing portions that engage both the end panels 2308a,b (shown in FIG. 23) and the side panels 2306a,b (shown in FIG. 23) to facilitate alignment between the plugs 2390,2392 and the insulation wrap 601. In some aspects, the bottom plug 2392 and the insulation wrap 601 can be coupled together and then inserted into the cavity 2302, and the top plug 2390 can be inserted in a separate step to assemble the insulated core 2500 within the cavity 2302. In some aspects, the bottom plug 2392 can be positioned within the cavity 2302, and the top plug 2390 and insulation wrap 601 can be coupled together and then inserted into the cavity 2302 to in a separate step to assemble the insulated core 2500 within the cavity 2302.

Figure 27:
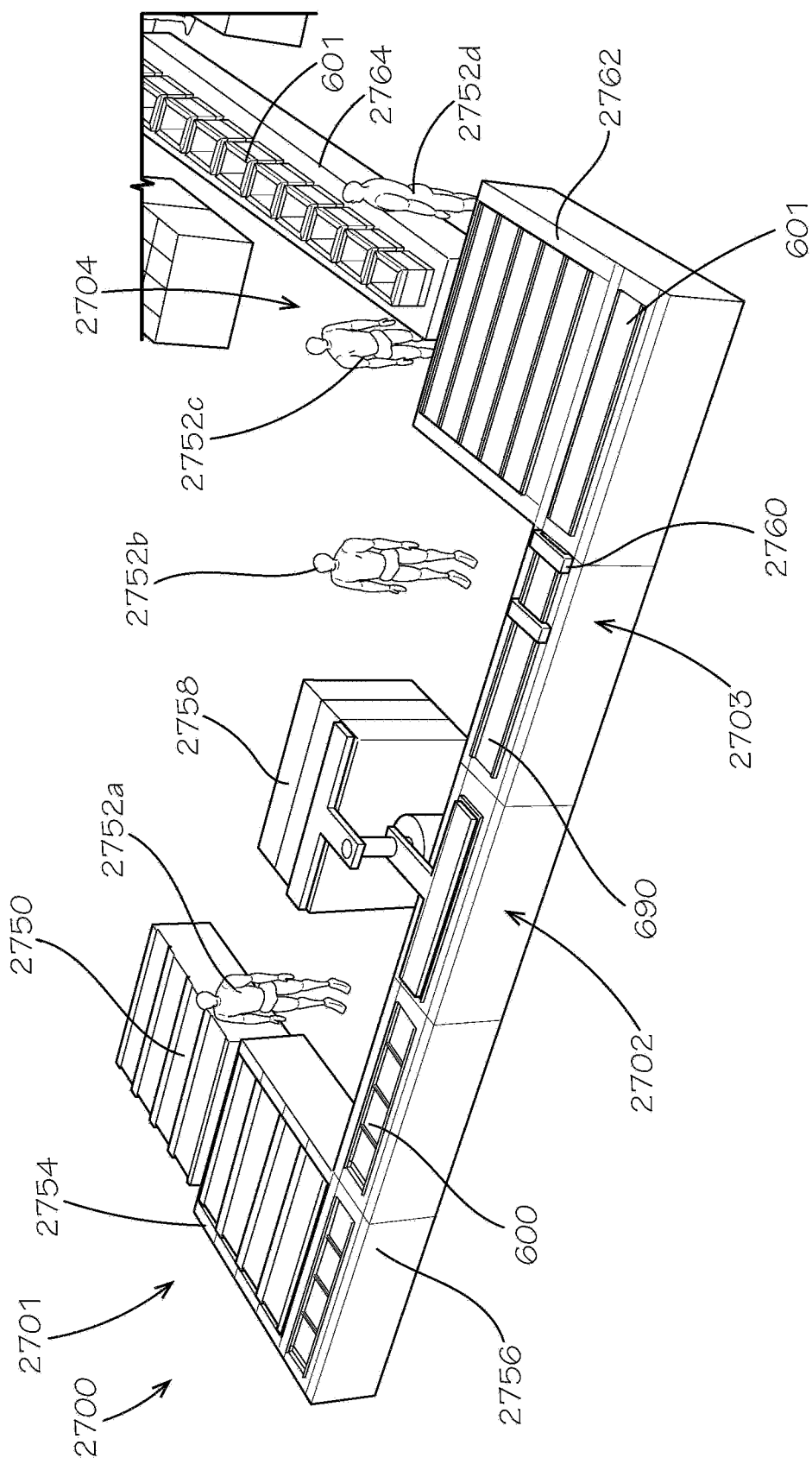
FIG. 27 is a perspective view of an assembly line for assembling and folding the insulation wraps of FIG. 6 in accordance with another aspect of the present disclosure.

FIG. 27 is a perspective view of an assembly line 2700 for assembling and folding the insulation wraps 601 of FIG. 6 in accordance with another aspect of the present disclosure. In a first step 2701, a worker 2752a can take wrap liner blanks 600 from a pallet 2750 and queue the wrap liner blanks 600 on a first work table 2754. From the first work table 2754, the wrap liner blanks 600 can be individually fed onto a first conveyor belt 2756.

In a second step 2702, the first conveyor belt 2756 can guide the wrap liner blanks 600 through an insulation station 2758 wherein insulation batts 690 can be positioned atop the wrap liner blanks 600. In the present aspect, this step can be performed by a machine at insulation station 2758, such as a pick-and-place robotic machine that picks up an insulation batt 690 and places it on each wrap liner blank 600. In other aspects, a worker 2752b can perform this step.

In step 2703, the insulation batt 690 and wrap liner blank 600 can pass through an assembly station 2760 wherein the wrap liner blanks 600 can be wrapped around the insulation batts 690 to form insulation wraps 601 in the assembled and unfolded configuration, as similarly described with respect to FIGS. 9 and 10 above. In the present aspect, assembly station 2760 can be a fold-and-glue station that folds the wrap liner blanks 600 and couples them to the insulation batts 690 with an adhesive. The unfolded insulation wraps 601 can then move from the first conveyor belt 2756 to a second work table 2762.

In step 2704, the insulation wraps 601 can be folded to the folded configuration and be placed on a second conveyor belt 2764. This step can be completed by one or more workers, such as workers 2752c,d, or by a machine (not shown). The steps 2701,2702,2703,2704 should not be viewed as limiting. Any step shown may be manually performed or automated, for example and without limitation.

Additionally, rather than folding the insulation wraps 601 in step 2704, the assembled insulation wraps 601 in the unfolded configuration can be palletized and shipped, such as to a customer, where the insulation wraps 601 can be folded on-site at the customer's location and used to contain and ship products. In some aspects, the insulation wraps 601 can be compressed before being palletized. By shipping the insulation wraps 601 in the unfolded configuration, the volume of the insulation wraps 601 can be minimized, thereby removing dead space and avoiding "shipping air" to the customer. Palletized liners 601 in the unfolded configuration also take less space in the customer's warehouse.

Figure 28:
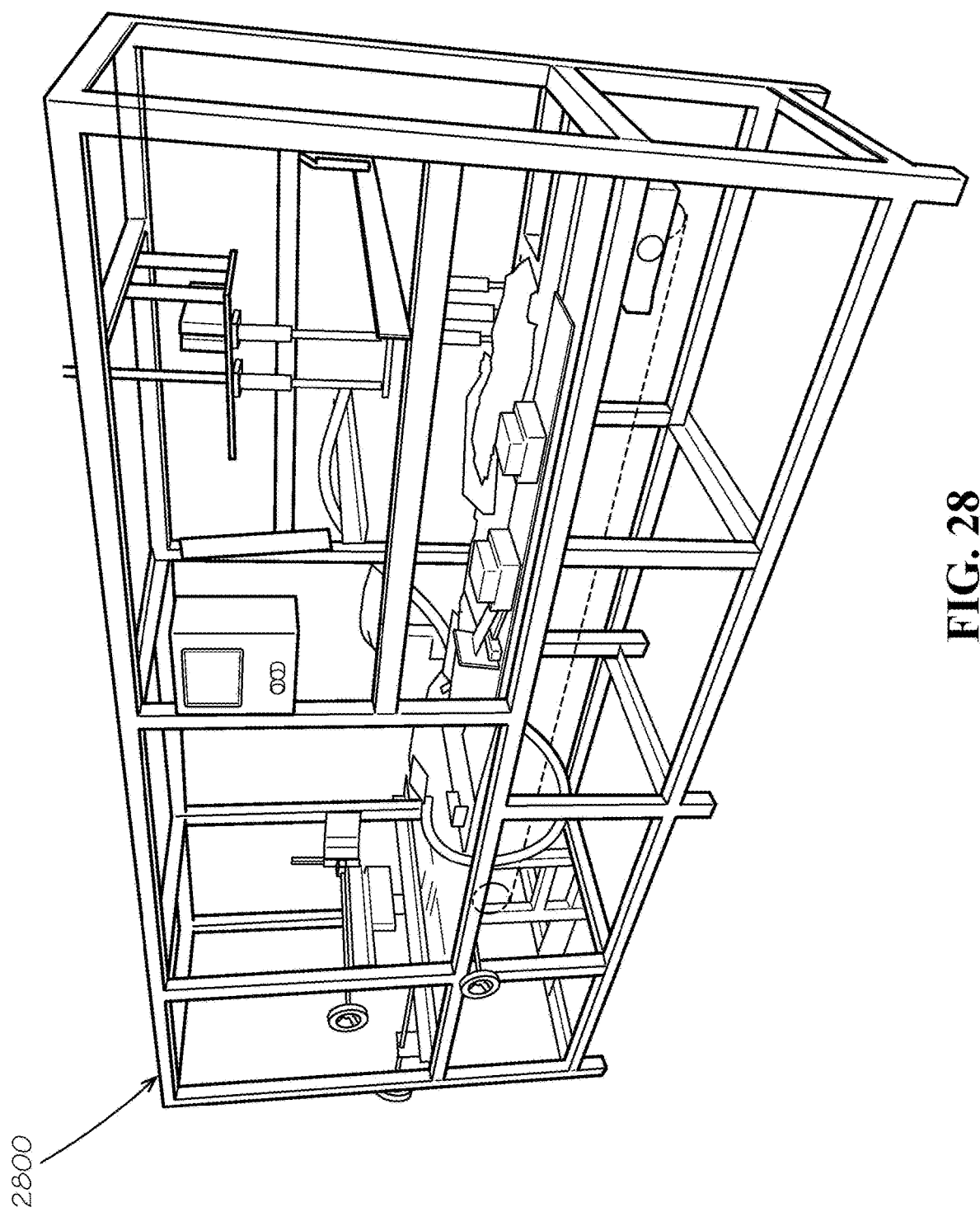
FIG. 28 is a perspective view of a machine for assembling the plugs of FIG. 16 in accordance with another aspect of the present disclosure.

FIG. 28 is a perspective view of a machine 2800 for assembling the plugs 1601 of FIG. 16, as shown and described with respect to FIGS. 16, 17, 21, and 22. In the present aspect, the 1600 can be specifically designed to facilitate automated assembly of the plugs 1601.

Figure 33:
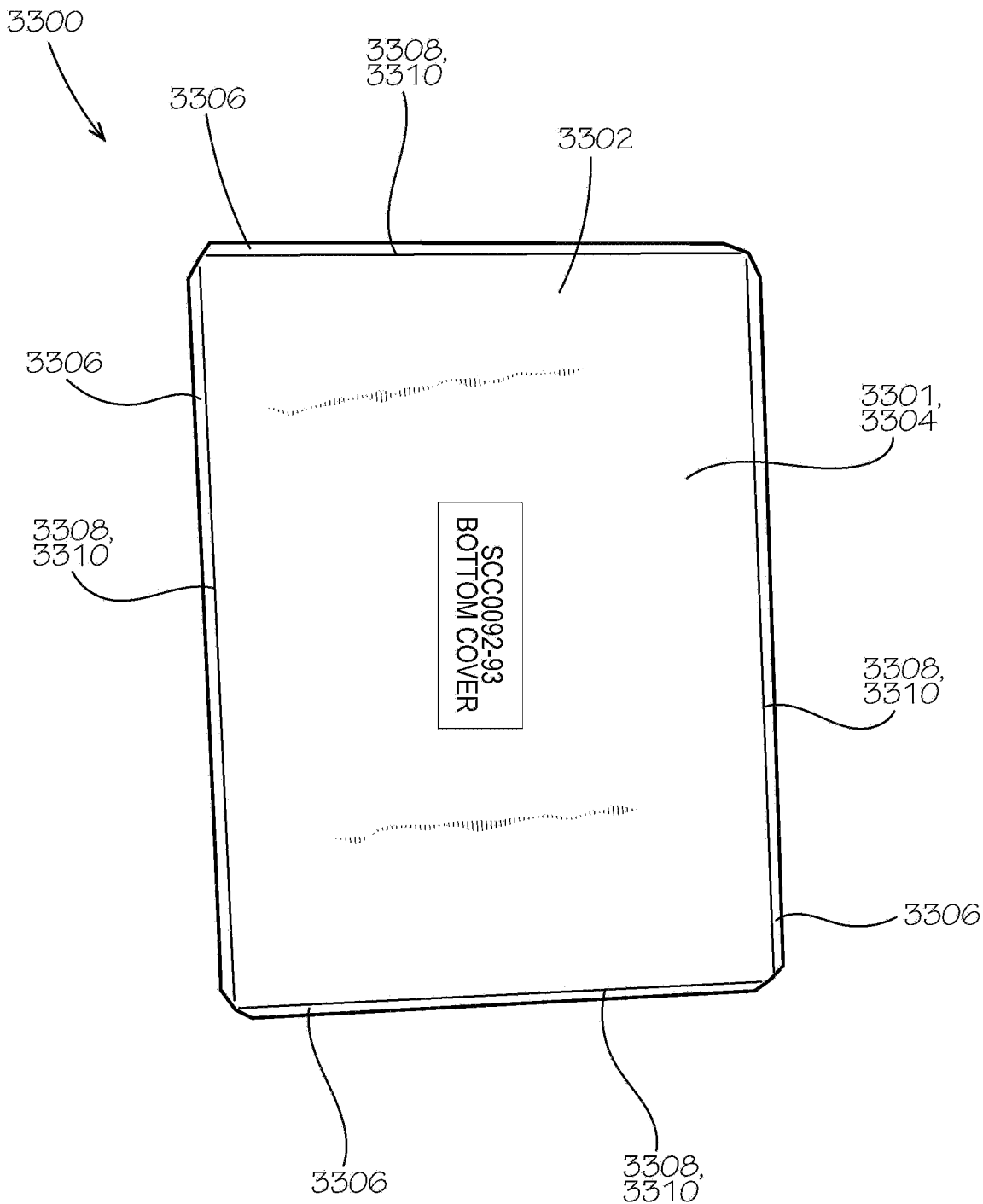
FIG. 33 is a top view of another aspect of a plug in accordance with another aspect of the present disclosure.
Figure 34:
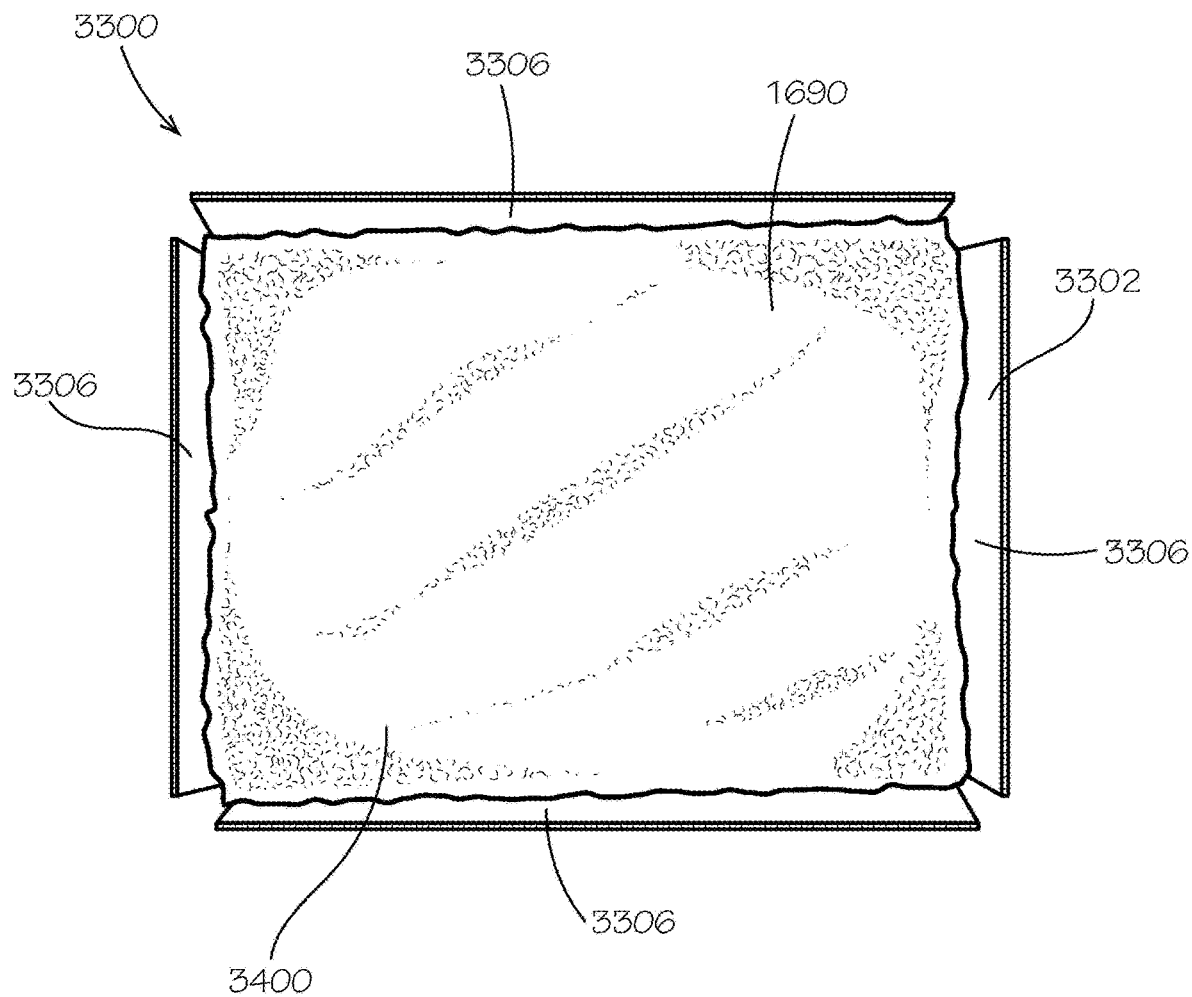
FIG. 34 is a bottom perspective view of the plug of FIG. 33.
Figure 35:
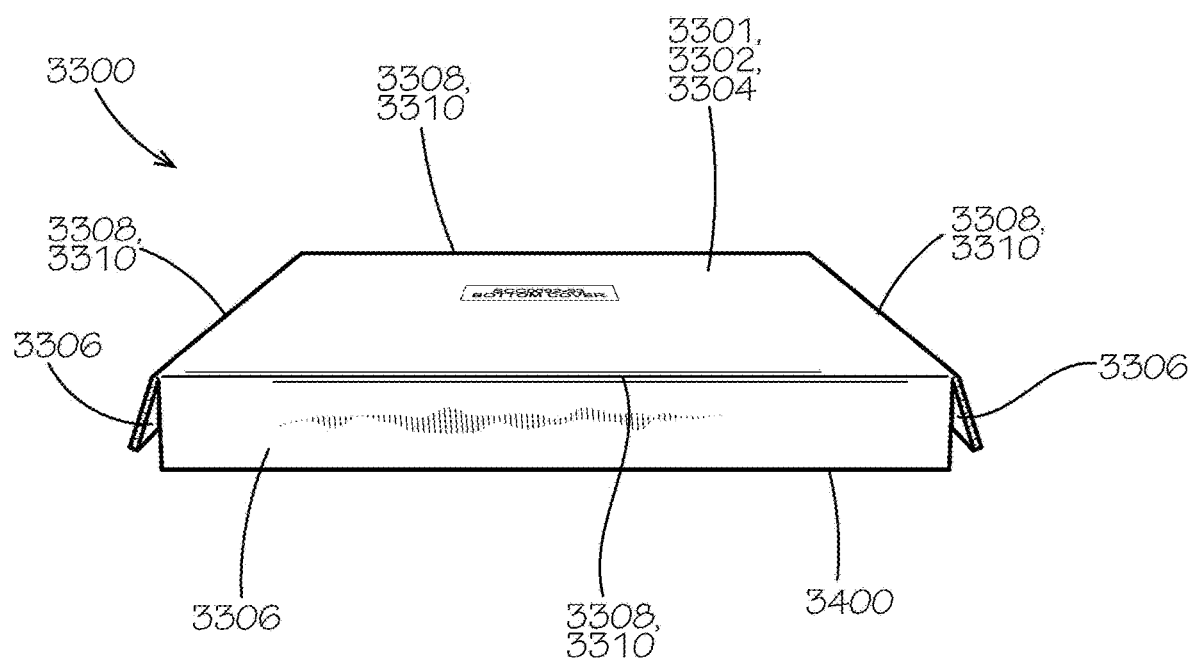
FIG. 35 is a side perspective view of the plug of FIG. 33.

FIGS. 33-35 show various views of another aspect of a plug 3300 in accordance with another aspect of the present disclosure. The plug 3300 can comprise another aspect of a plug blank 3302 (shown in FIGS. 33-35 and 41) and the insulation batt 1690 (shown in FIG. 34) of FIG. 16. As shown in FIG. 33, the plug blank 3302 can comprise a center panel 3304 and a plurality of side panels 3306. The center panel 3304 can define a top side 3301 of the plug 3300. Each of the side panels 3306 can be hingedly coupled to a different edge 3308 of the center panel 3304 by a different hinge 3310.

The insulation batt 1690 (shown in FIG. 34) can be positioned in facing engagement with the center panel 3304 (shown in FIGS. 33 and 35). As shown in FIG. 34, the side panels 3306 can fold around the insulation batt 1690. The center panel 3304 and the side panels 3306 can partially enclose the insulation batt 1690. In the present aspect, the insulation batt 1690 may only be exposed on a bottom side 3400 of the plug 3300, so that the insulation batt 1690 and the side panels 3306 can define the bottom side 3400.

Figure 36:
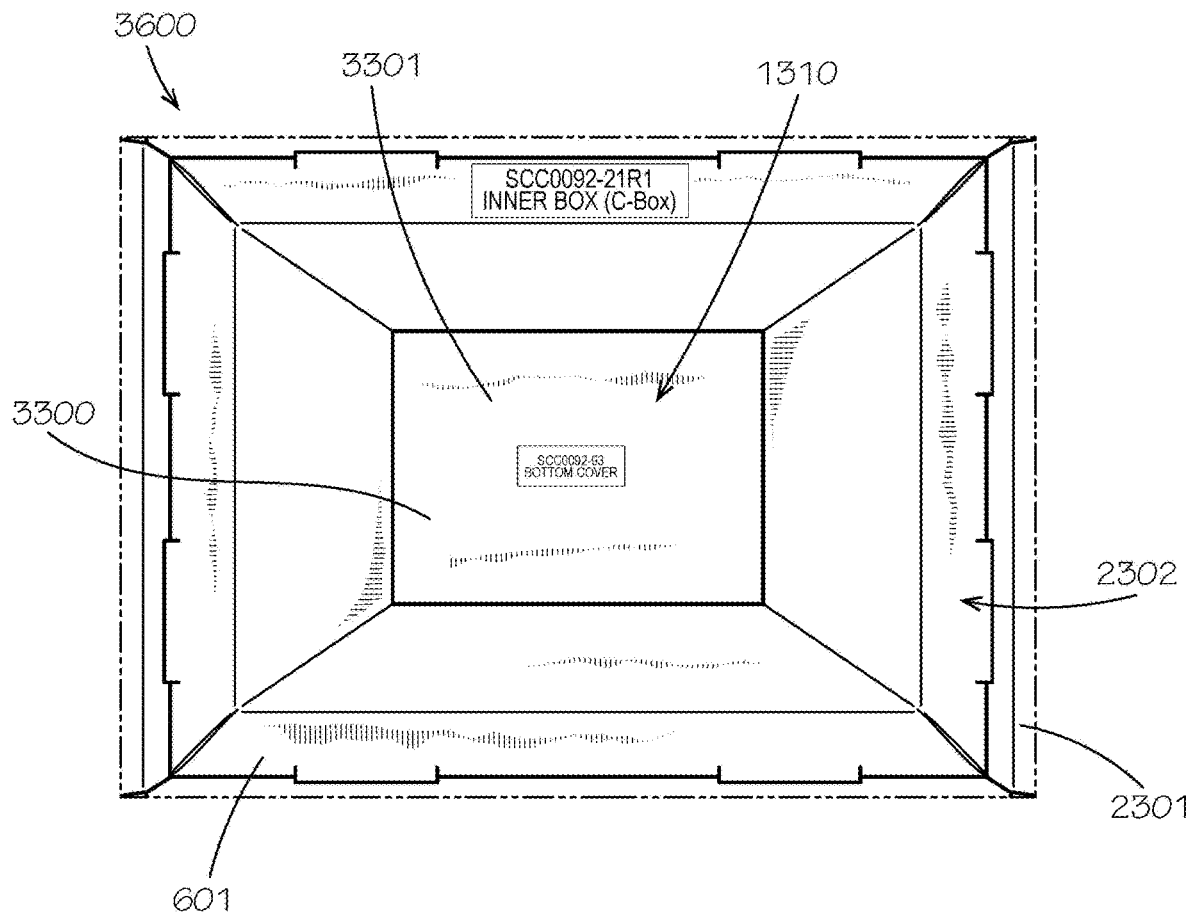
FIG. 36 is a top perspective view of another aspect of a packaging assembly with the plug of FIG. 33 and the insulation liner of FIG. 6 inserted into the cavity of the box of FIG. 23.

FIG. 36 is a top perspective view of another aspect of a packaging assembly 3600 with the plug 3300 of FIG. 33 and the insulation liner 601 of FIG. 6 inserted into the cavity 2302 of the box 2301 of FIG. 23. The plug 3300 can be positioned within the insulated cavity 1310, with the top side 3301 facing into the insulated cavity 1310. With the side panels 3306 (shown in FIGS. 33-35) folded around the insulation batt 1690 (shown in FIG. 34), the side panels 3306 can provide structural support to the plug 3300 to prevent the insulation batt 1690 from being compressed when a load is placed atop the plug 3300.

Figure 37:
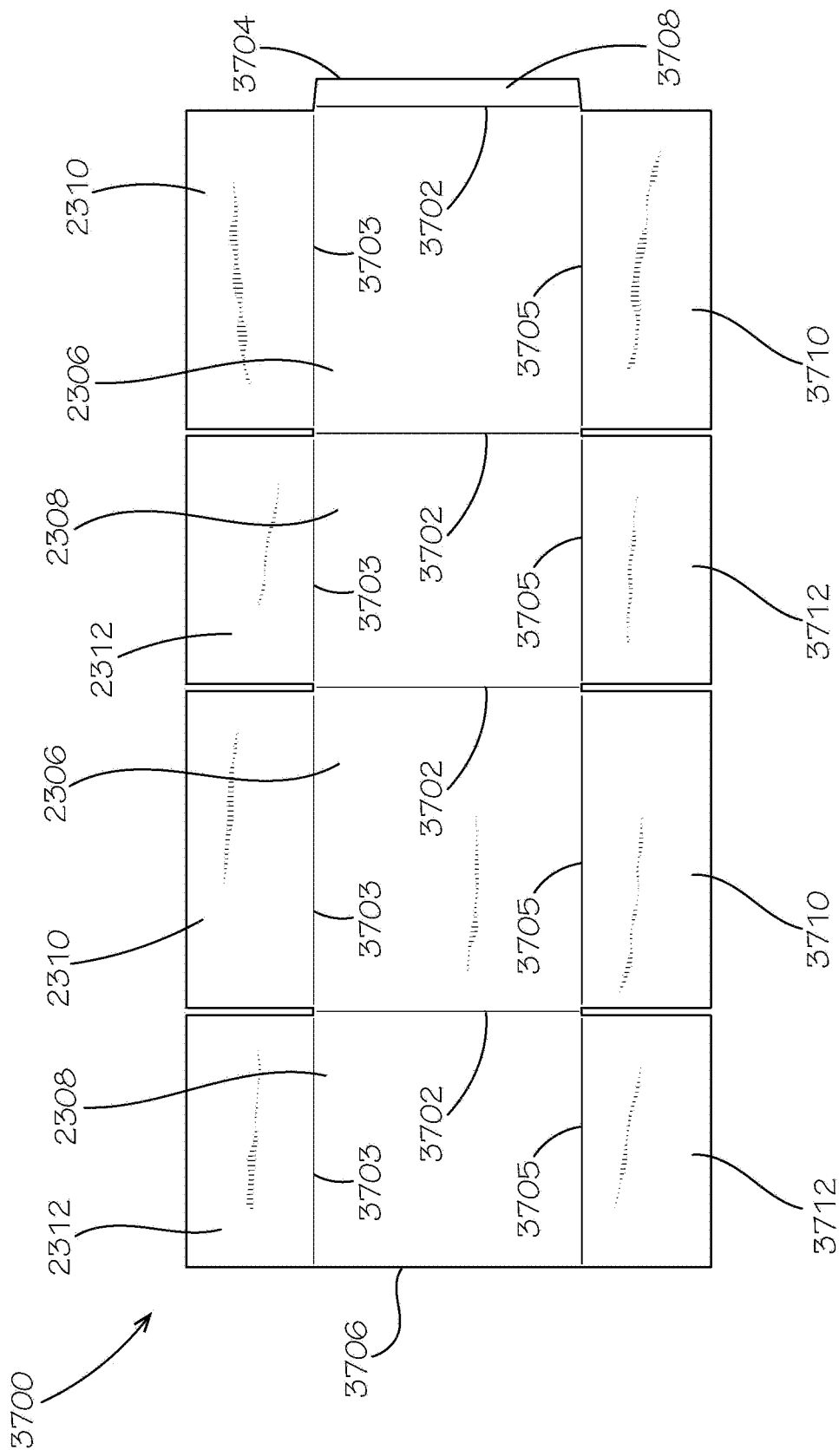
FIG. 37 is a top plan view of a box blank of the box of FIG. 23 in accordance with another aspect of the present disclosure.

FIG. 37 is a top plan view of a box blank 3700 of the box 2301 of FIG. 23. The side panels 2306 and the end panels 2308 can be coupled together by corner hinges 3702. An end tab 3708 can also be coupled to one of the side or end panels 2306,2308 by one of the corner hinges 3702. The end tab 3708 can define a first end 3704 of the box blank 3700, and the box blank 3700 can define a second end 3706 opposite from the first end 3704. The top side flaps 2310 and top end flaps 2312 can be coupled to the respective side or end panels 2306,2308 by top hinges 3703.

The bottom panel 2304 (shown in FIG. 23) can be defined by a pair of bottom side flaps 3710 and bottom end flaps 3712. The bottom side flaps 3710 can be coupled to the side panels 2306 by bottom hinges 3705, and the bottom end flaps 3712 can be coupled to the end panels 2308 by bottom hinges 3705.

Figure 38:
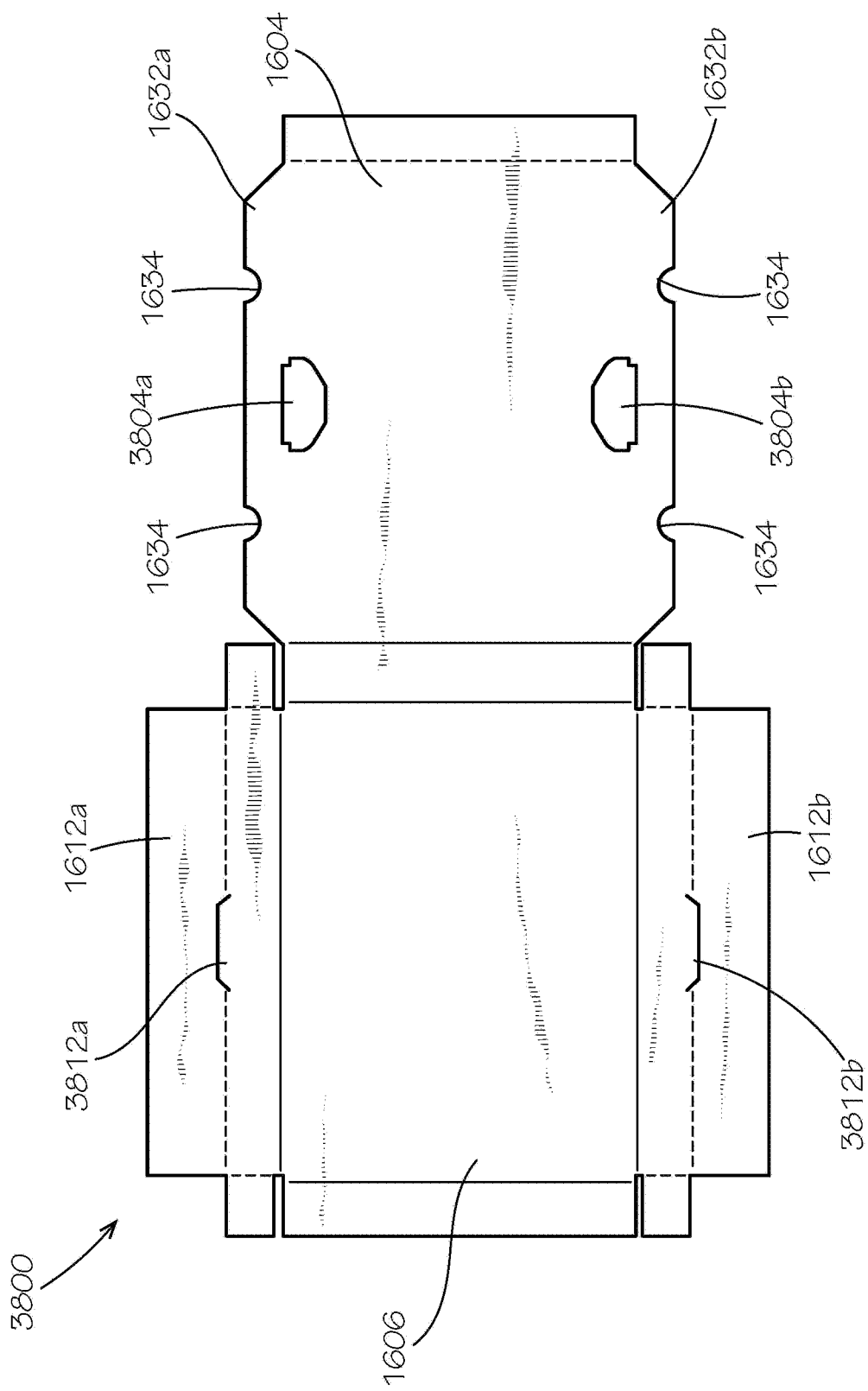
FIG. 38 is a top plan view of another aspect of a plug blank in accordance with another aspect of the present disclosure.

FIG. 38 is a top plan view of a plug blank 3800 in accordance with another aspect of the present disclosure. The outer panel 1604 can define a pair of folding tabs 3804a,b. The folding tabs 3804a,b can be cutout from the outer panel 1604. The folding tabs 3804a,b can be positioned inward from the wing portions 1632a,b of the outer panel 1604. In the aspect shown, each wing portion 1632a,b can define a pair of finger notches 1634. In some aspects, each wing portion 1632a,b can define greater or fewer than two finger notches 1634.

The wing portions 1612a,b coupled to the inner panel 1606 can define a pair of wing slots 3812a,b. When the plug blank 3800 is folded to form a plug, such as a plug similar in some ways to the plug 1601 of FIG. 16, the wing slots 3812a,b can receive the folding tabs 3804a,b to couple the outer panel 1604 to the wing portions 1612a,b and the inner panel 1606. In such aspects, the wing portions 1612a,b may or may not be coupled to the outer panel 1604 with a secondary means, such as an adhesive for example and without limitation.

Figure 39:
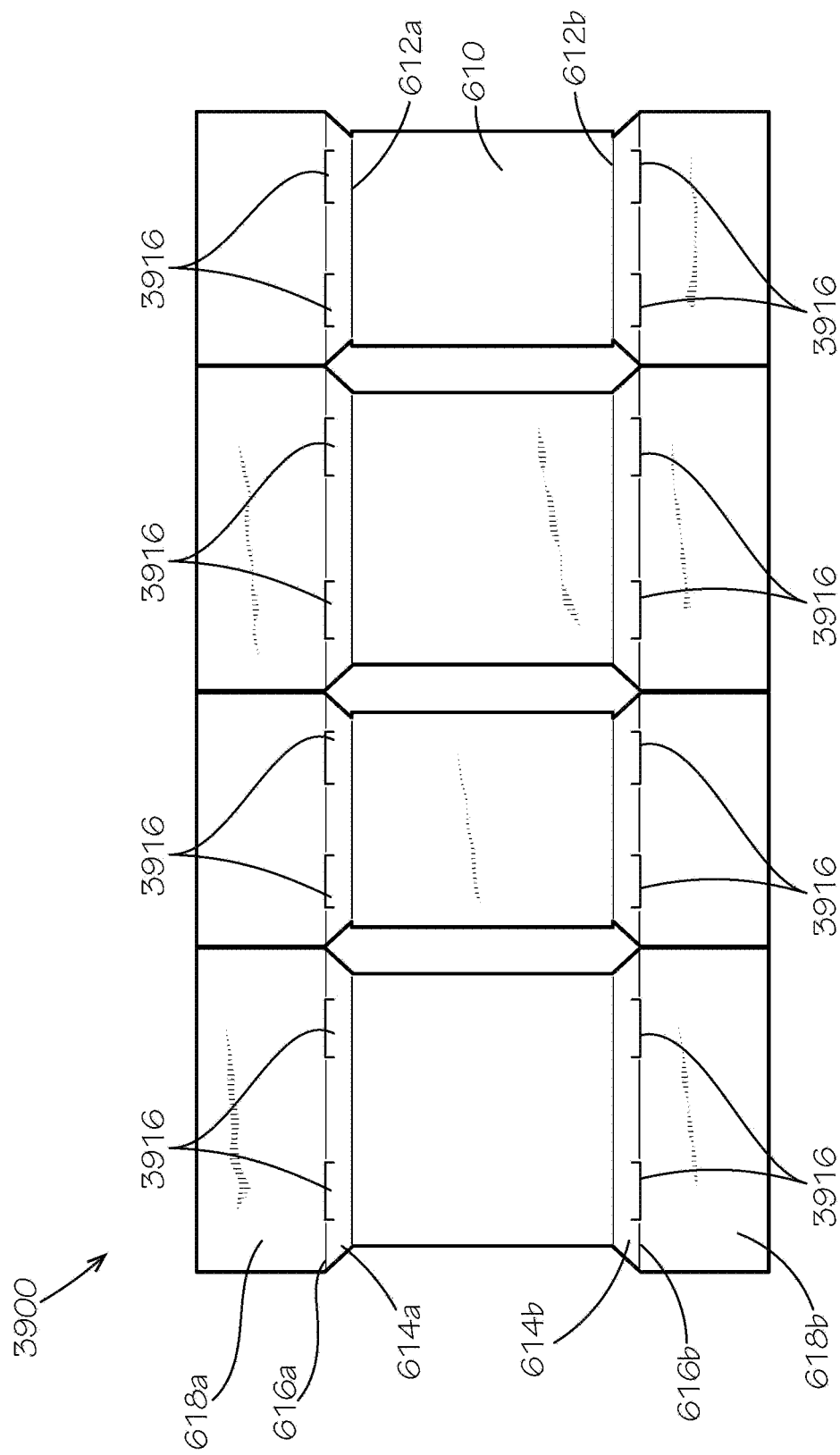
FIG. 39 is a top plan view of another aspect of the wrap liner blank in accordance with another aspect of the present disclosure.

FIG. 39 is a top plan view of another aspect of a wrap liner blank 3900 in accordance with another aspect of the present disclosure. The wrap liner blank 3900 can share some features in common with the wrap liner blank 600 of FIG. 6. In the aspect shown, the outer portions 618a,b can be extended so that when the wrap liner blank 3900 is folded about the inner hinges 612a,b and the ledge hinges 616a,b, the outer portions 618a,b can touch or nearly touch one another. For example and without limitation, the outer portions 618a,b can come within 1" or less of contacting one another when the inner portion 610 and the outer portions 618a,b are folded perpendicular to the ledge portions 614a,b. In some aspects, the outer portions 618a,b can partially or fully overlap one another.

In the present aspect, the ledge hinges 616a,b can define a plurality of relief cuts 3916, which can facilitate folding of the outer portions 618a,b relative to the ledge portions 614a,b about the ledge hinges 616a,b. In some aspects, the inner hinges 612a,b can define a plurality of relief cuts in addition to or in place of the relief cuts 3916.

Figure 40:
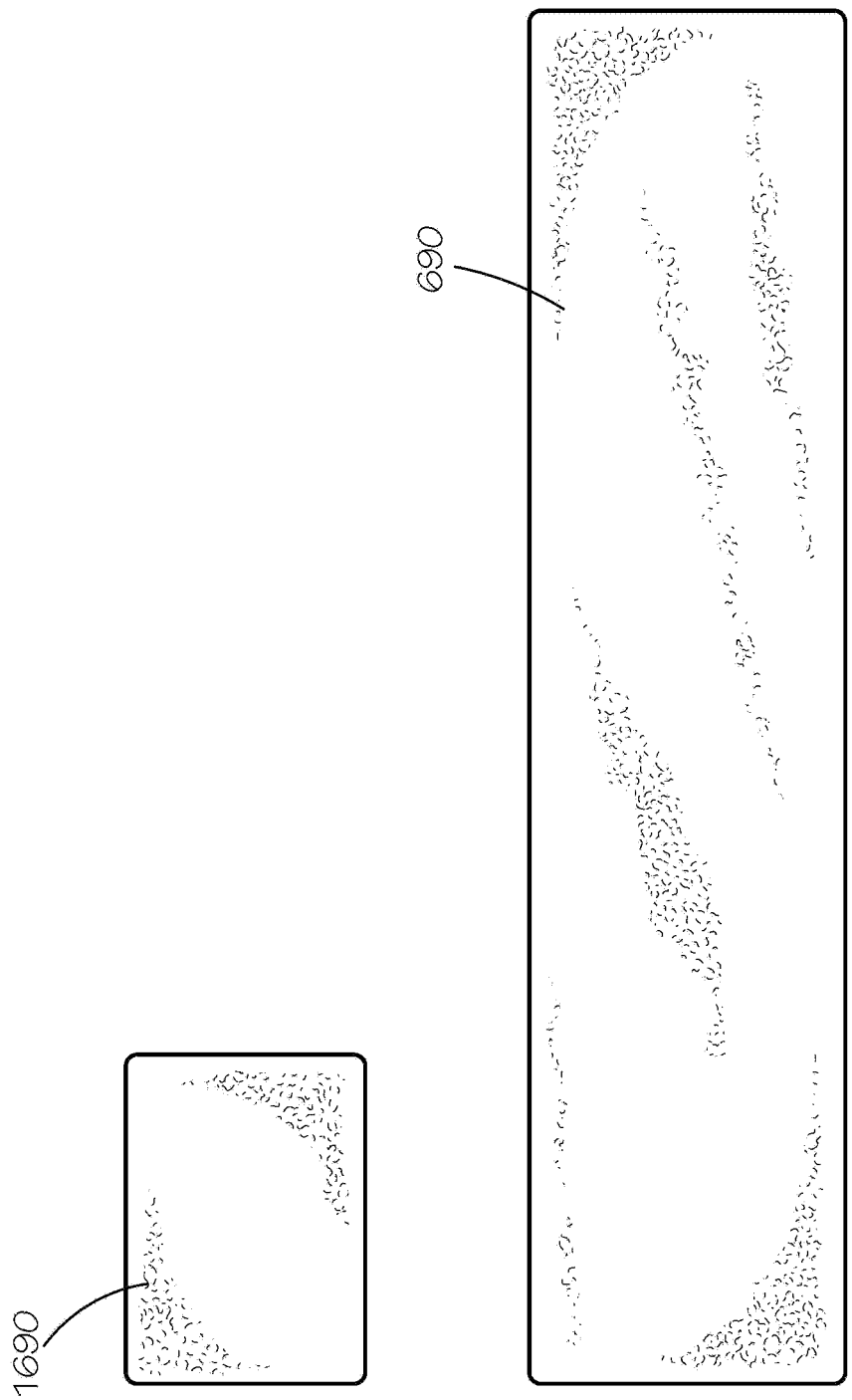
FIG. 40 is a top plan view of the insulation batt of FIG. 6 and the insulation batt of FIG. 16.
Figure 41:
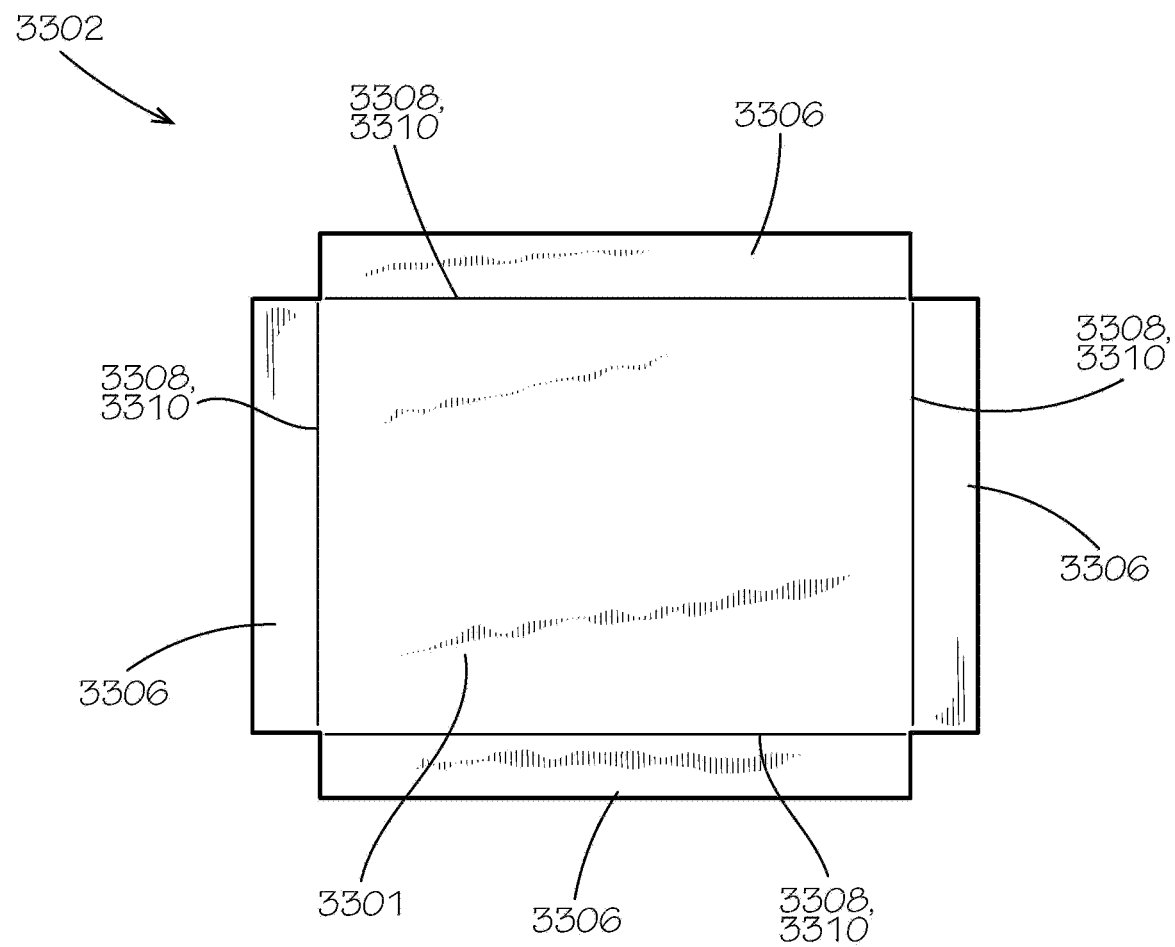
FIG. 41 is a top plan view of another aspect of a plug blank in accordance with another aspect of the present disclosure.

FIG. 40 is a top plan view of the insulation batt 690 of FIG. 6 and the insulation batt 1690 of FIG. 16. The insulation batt 690 can be between 0.25" and 2" thick. Preferably, the insulation batt 690 can be 0.75" to 0.825" thick. The insulation batt 690 can have a weight of about 700 grams per square meter ("GSM"), depending on thickness. The insulation batt 1690 can be between 1" and 3" in thickness. Preferably, the insulation batt 1690 can be between 1.5" and 1.65" in thickness. The insulation batt 1690 can have a weight of about 1400 GSM, depending on thickness.

In the present aspect, the blanks 600, 1600 and/or the box 2301 can comprise corrugated cardboard. In other aspects, the blanks 1600,1600 and/or the box 2301 can comprise a different material, such as posterboard, corrugated plastic, polymer sheet material, or any other suitable material. In the present aspect, the blanks 600, 1600 and/or the box 2301 can be die cut.

The backing sheet 796 can comprise Kraft paper. In other aspects, the backing sheet 796 can comprise a different material, such as a polymer film, corrugated cardboard, posterboard, corrugated plastic, or polymer sheet material, for example and without limitation.

In the present aspect, the insulation batts 690,1690 can comprise paper or other paper fiber materials; however, in other aspects, the insulation batts can comprise cotton, foam, rubber, plastics, fiberglass, mineral wool, or any other flexible insulation material. In the present application, the insulation batts 690,1690 can be repulpable. In the present aspect, the packaging assembly 2300 can be 100% recyclable. In the present aspect, the packaging assembly 2300 can be single-stream recyclable wherein all materials comprised by the packaging assembly 2300 can be recycled by a single processing train without requiring separation of any materials or components of the packaging assembly 2300. In the present aspect, the packaging assembly 2300 can be compostable. In the present aspect, the packaging assembly 2300 can be repulpable. In the present aspect, the packaging assembly 2300 and all components thereof can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, IL which is hereby incorporated in its entirety. In the present aspect, the packaging assembly 2300 and all components thereof can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, IL.

Recyclable and repulpable insulation materials are further described in U.S. Patent Application No. 62/375,555, filed Aug. 16, 2016, U.S. Patent Application No. 62/419,894, filed Nov. 9, 2016, and U.S. Patent Application No. 62/437,365, filed Dec. 21, 2016, which are each incorporated by reference in their entirety herein.

The packaging assembly 2300 can be used in applications in which a user or mail carrier transports perishable or temperature-sensitive goods. For example and without limitation, the packaging assembly 2300 can be used to transport pharmaceuticals or groceries. The packaging assembly 2300 can improve upon a common cardboard box by providing insulation to prevent spoilage or deterioration of the contents.

In order to ship temperature-sensitive goods, common cardboard boxes are often packed with insulating materials made of plastics or foams which are not accepted by many recycling facilities or curb-side recycling programs in which a waste management service collects recyclables at a user's home. Consequently, shipping temperature-sensitive goods often produces non-recyclable waste which is deposited in landfills. The insulation materials often decompose very slowly, sometimes over the course of several centuries. In some instances, non-recyclable and non-biodegradable insulating materials can enter the oceans where the insulation materials can remain for years and harm marine life. In some aspects, the packaging assembly 2300 can reduce waste and pollution by comprising materials which are recyclable or biodegradable. In aspects in which the packaging assembly 2300 is curb-side or single-stream recyclable, the user may be more likely to recycle the insulated packaging assembly 2300 due to the ease of curb-side collection.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A packaging assembly comprising:
   an outer box comprising a plurality of side panels defining an interior cavity; and
   a wrap liner comprising:
      an outer portion extending from a first panel to a second panel, the outer portion defining an outer hinge coupling the first panel to the second panel;
      a ledge portion extending across the first panel and the second panel, the ledge portion coupled to the outer portion by a first ledge hinge and a second ledge hinge; and
      an inner portion extending across the first panel and the second panel, a first inner hinge, and a second inner hinge each coupling the inner portion to the ledge portion;
   wherein:
      the wrap liner is disposed within the interior cavity of the outer box;
      an inner side flap extends at least partially across a clearance notch separating a portion of the inner portion; and
      the inner side flap is coupled to the portion of the inner portion.

2. The packaging assembly of claim 1, wherein the outer portion of the wrap liner contacts an inner surface of the outer box.

3. The packaging assembly of claim 1, wherein a height of the outer portion of the wrap liner is greater than a height of the inner portion of the wrap liner.

4. The packaging assembly of claim 1, further comprising an insulation batt and wherein an outer side of the insulation batt is coupled to the outer portion of the wrap liner blank.

5. The packaging assembly of claim 4, wherein the insulation batt is disposed in a gap defined between the inner portion and the outer portion of the wrap liner.

6. The packaging assembly of claim 1, wherein the outer hinge is perpendicular to the first inner hinge, an outer side of an insulation batt is coupled to the outer portion of the wrap liner blank, and an inner side of the insulation batt is coupled to the inner portion of the wrap liner blank.

7. The packaging assembly of claim 1, wherein:
   the first panel is foldable relative to the second panel about the outer hinge; and
   the inner portion defines a clearance notch separating a portion of the inner portion.

8. The packaging assembly of claim 1, wherein:
   the ledge portion comprises a first ledge portion defined by the first panel and a second ledge portion;
   the ledge portion defines a ledge clearance notch in the first ledge portion; and
   the ledge clearance notch separates a portion of the first ledge portion defined by the first panel from the first ledge portion defined by the second panel.

9. The packaging assembly of claim 1, wherein:
   the wrap liner blank defines a first end and a second end opposite from the first end; and the first end and the second end define a closure mechanism configured to secure the first end to the second end.

10. The packaging assembly of claim 1, wherein the wrap liner blank defines:
   a first end defining an aperture; and
   a second end opposite the first end and comprising a tab configured to be received in the aperture defined at the first end.

11. The packaging assembly of claim 10, wherein the tab and the aperture are defined by the outer portion of the wrap liner blank.

12. A wrap liner for use in a packaging assembly including a box, the wrap liner comprising:
   a wrap liner blank comprising:
      an outer portion extending from a first panel to a second panel, the outer portion defining an outer hinge coupling the first panel to the second panel;
      a ledge portion extending across the first panel and the second panel, the ledge portion coupled to the outer portion by a first ledge hinge and a second ledge hinge;
      an inner portion extending across the first panel and the second panel, a first inner hinge, and a second inner hinge each coupling the inner portion to the ledge portion;
      a first end defining an aperture; and
      a second end opposite the first end and comprising a tab configured to be received in the aperture defined at the first end.

13. The wrap liner of claim 12, wherein the outer portion of the wrap liner contacts an inner surface of the outer box.

14. The wrap liner of claim 12, wherein a height of the outer portion of the wrap liner is greater than a height of the inner portion of the wrap liner.

15. The wrap liner of claim 12, further comprising an insulation batt and wherein an outer side of the insulation batt is coupled to the outer portion of the wrap liner blank.

16. The wrap liner of claim 15, wherein the insulation batt is disposed in a gap defined between the inner portion and the outer portion of the wrap liner.

17. The wrap liner of claim 12, wherein the outer hinge is perpendicular to the first inner hinge, an outer side of an insulation batt is coupled to the outer portion of the wrap liner blank, and an inner side of the insulation batt is coupled to the inner portion of the wrap liner blank.

18. A packaging assembly comprising:
   an outer box comprising a plurality of side panels defining an interior cavity; and
   a wrap liner comprising:
      an outer portion extending from a first panel to a second panel, the outer portion defining an outer hinge coupling the first panel to the second panel;
      a ledge portion extending across the first panel and the second panel, the ledge portion coupled to the outer portion by a first ledge hinge and a second ledge hinge;
      an inner portion extending across the first panel and the second panel, a first inner hinge, and a second inner hinge each coupling the inner portion to the ledge portion;
      a first end defining an aperture; and
      a second end opposite the first end and comprising a tab configured to be received in the aperture defined at the first end,
   wherein the wrap liner is disposed within the interior cavity of the outer box.

19. The packaging assembly of claim 18, wherein the tab and the aperture are defined by the outer portion of the wrap liner blank.

* * * * *